(12) United States Patent
Choki et al.

(10) Patent No.: US 8,340,404 B2
(45) Date of Patent: Dec. 25, 2012

(54) IMAGE PROCESSING DEVICE AND METHOD, LEARNING DEVICE AND METHOD, PROGRAM, AND RECORDING MEDIUM

(75) Inventors: Yuta Choki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1097 days.

(21) Appl. No.: 12/257,494

(22) Filed: Oct. 24, 2008

(65) Prior Publication Data

US 2009/0161947 A1 Jun. 25, 2009

(30) Foreign Application Priority Data

Dec. 21, 2007 (JP) ................................. 2007-330092

(51) Int. Cl.
*G06K 9/00* (2006.01)
(52) U.S. Cl. ...................................................... 382/155
(58) Field of Classification Search ......................... None
See application file for complete search history.

(56) References Cited

U.S. PATENT DOCUMENTS

| | | | | |
|---|---|---|---|---|
| 5,406,334 A | * | 4/1995 | Kondo et al. | 348/581 |
| 5,499,057 A | * | 3/1996 | Kondo et al. | 348/607 |
| 7,483,079 B2 | * | 1/2009 | Kondo et al. | 348/458 |
| 7,595,819 B2 | * | 9/2009 | Kondo | 348/222.1 |
| 7,750,943 B2 | * | 7/2010 | Nagano et al. | 348/208.12 |
| 2010/0026722 A1 | * | 2/2010 | Kondo | 345/660 |

FOREIGN PATENT DOCUMENTS

| | | |
|---|---|---|
| JP | 2001-285870 | 10/2001 |
| JP | 2006-141046 | 6/2006 |

OTHER PUBLICATIONS

Peter List, et al., "Adaptive Deblocking Filter", IEEE Transactions on Circuits and Systems for Video Technology, vol. 13, No. 7, Jul. 2003, 6 pages.

\* cited by examiner

*Primary Examiner* — Vikkram Bali
(74) *Attorney, Agent, or Firm* — Oblon, Spivak, McClelland, Maier & Neustadt, L.L.P.

(57) ABSTRACT

An image processing device includes: a smoothing section configured to extract a smoothing tap and smooth a target image on the basis of pixel values within the tap, the smoothing tap being of variable size and including plural pixels centered on each target pixel of the image; a class tap extracting section configured to extract a class tap including plural pixels centered on each target pixel in the smoothed image; a class code determining section configured to generate a code corresponding to a characteristic of variation of pixel values within the class tap, and determine a class code including a size of the smoothing tap and the code; and a pixel value computing section configured to read tap coefficients corresponding to the determined class code, and multiply pixel values forming a prediction tap extracted from the smoothed image, by the tap coefficients to calculate pixel values of a processed image.

16 Claims, 14 Drawing Sheets

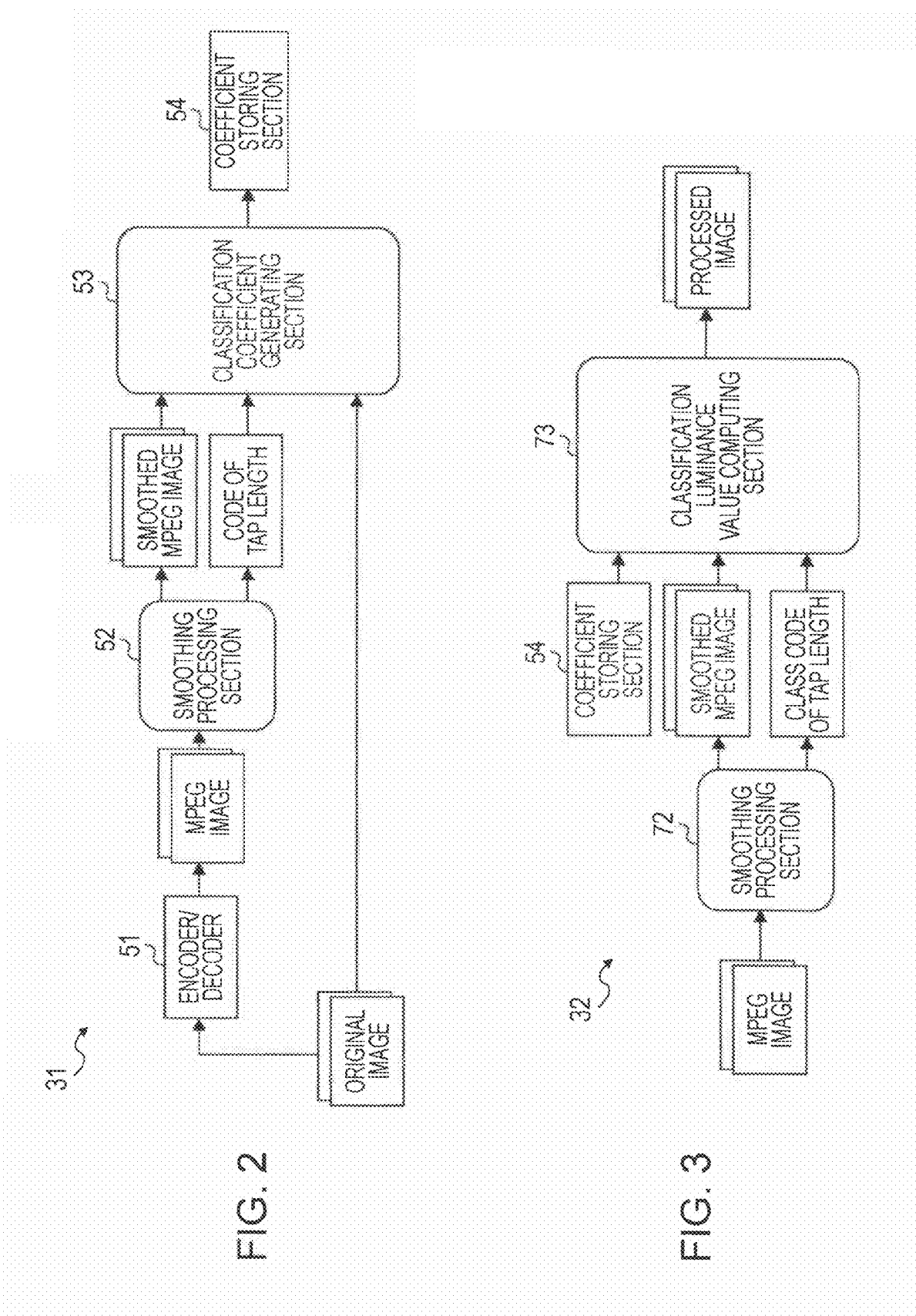

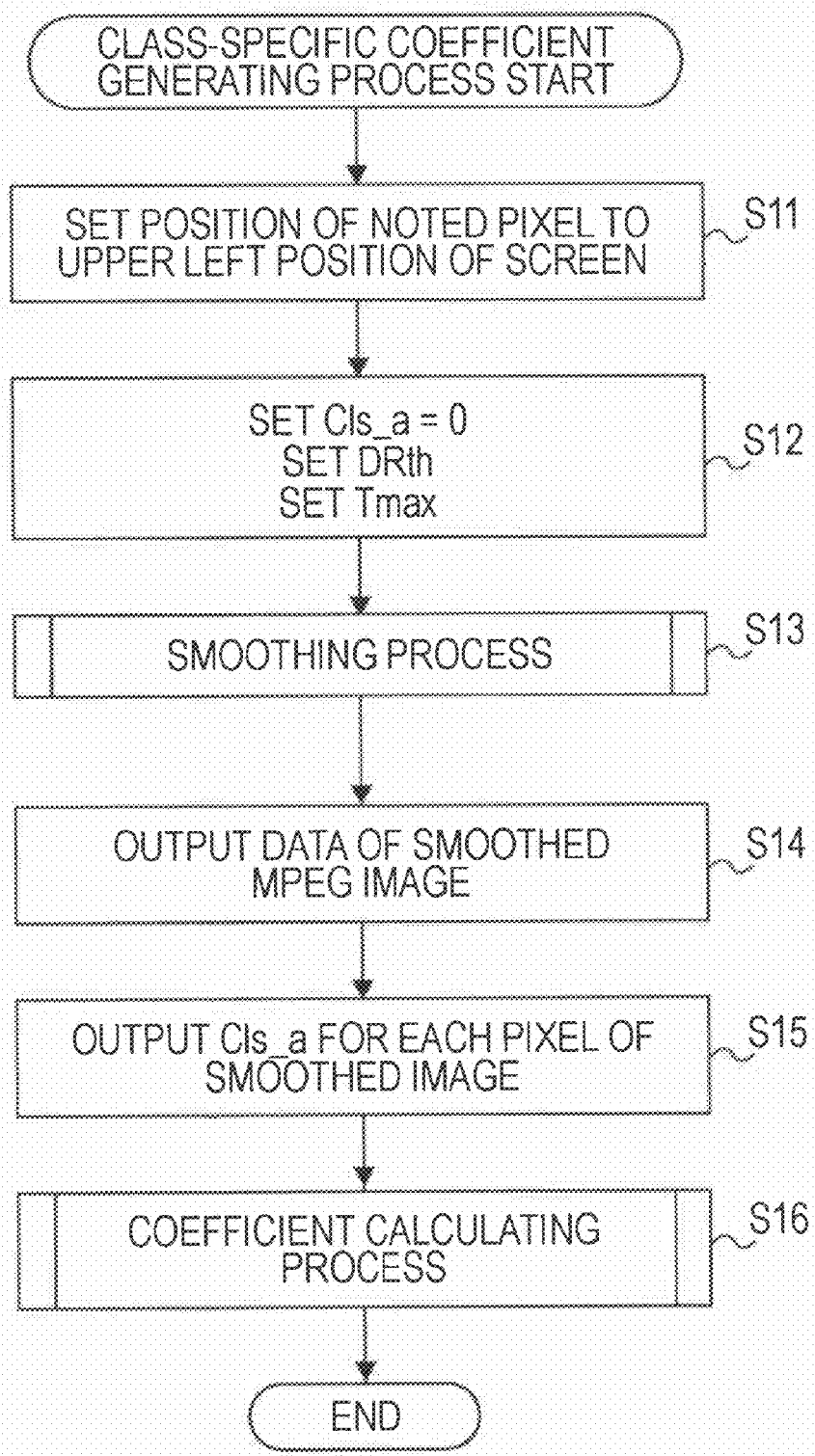

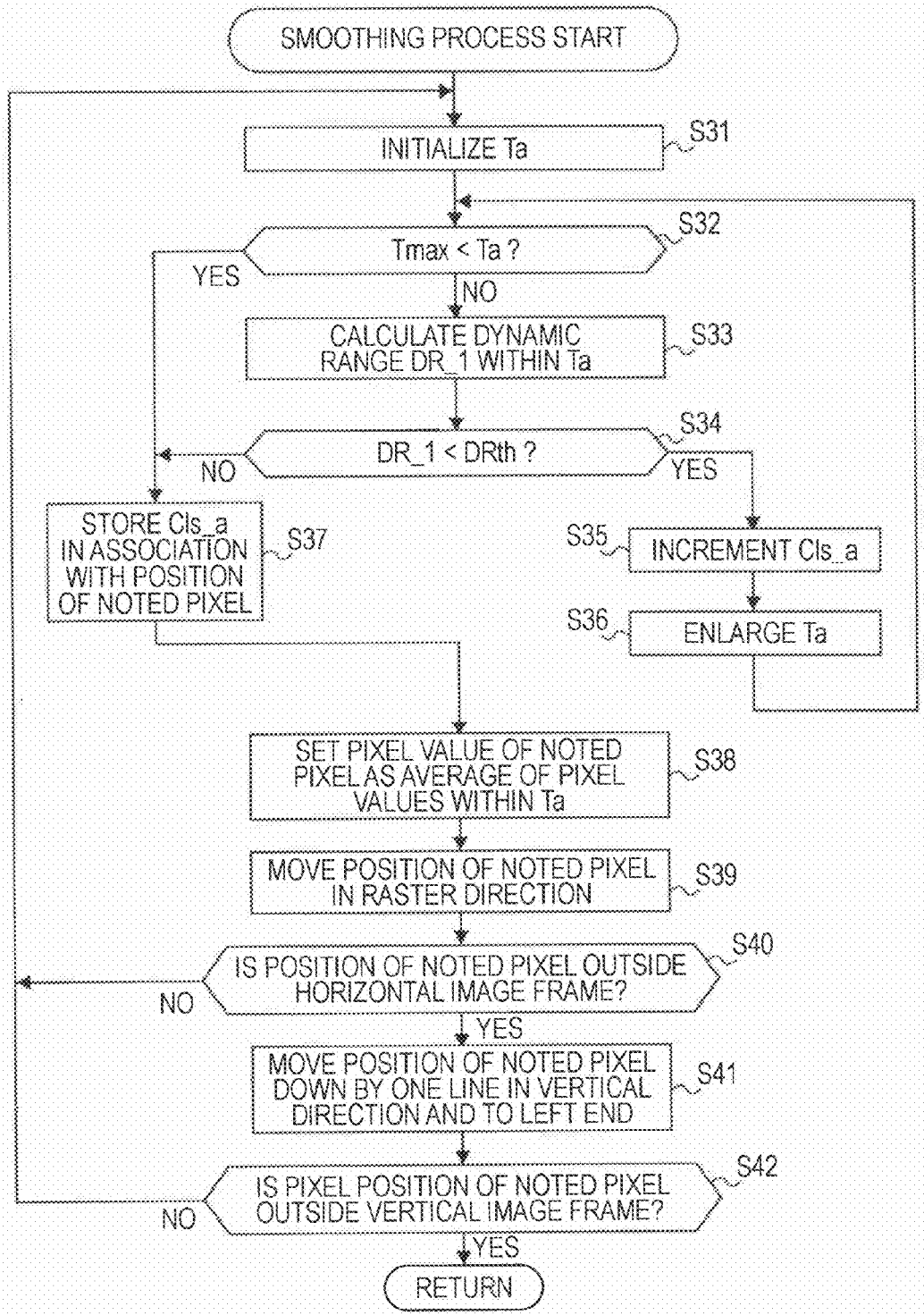

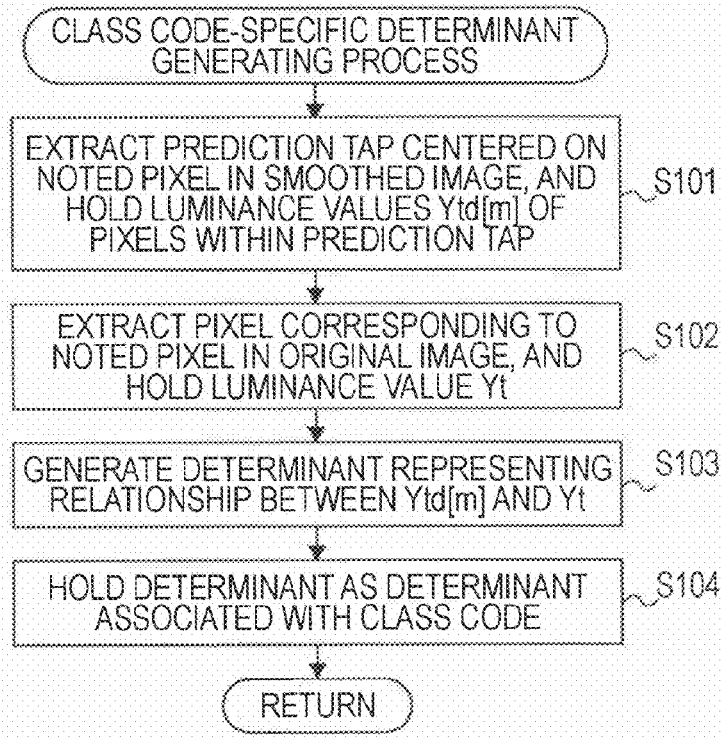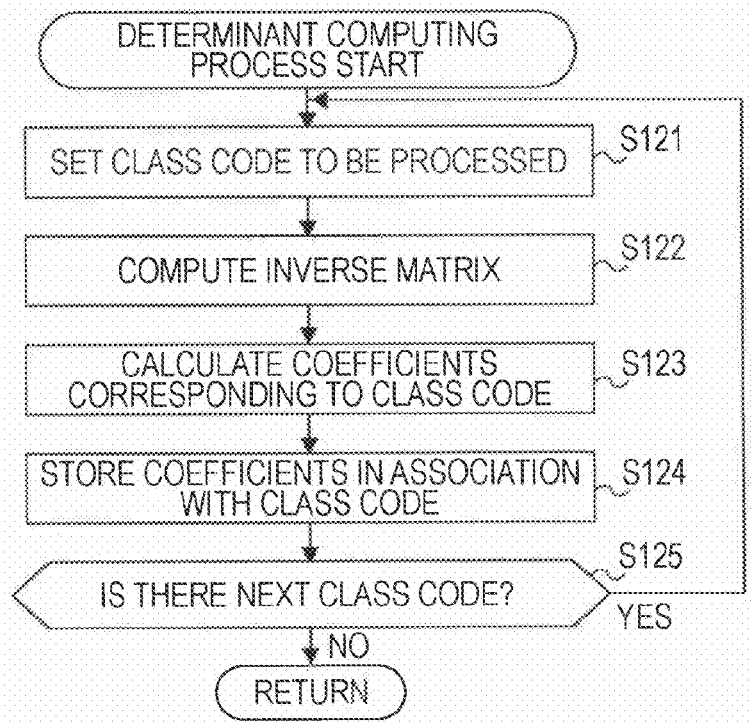

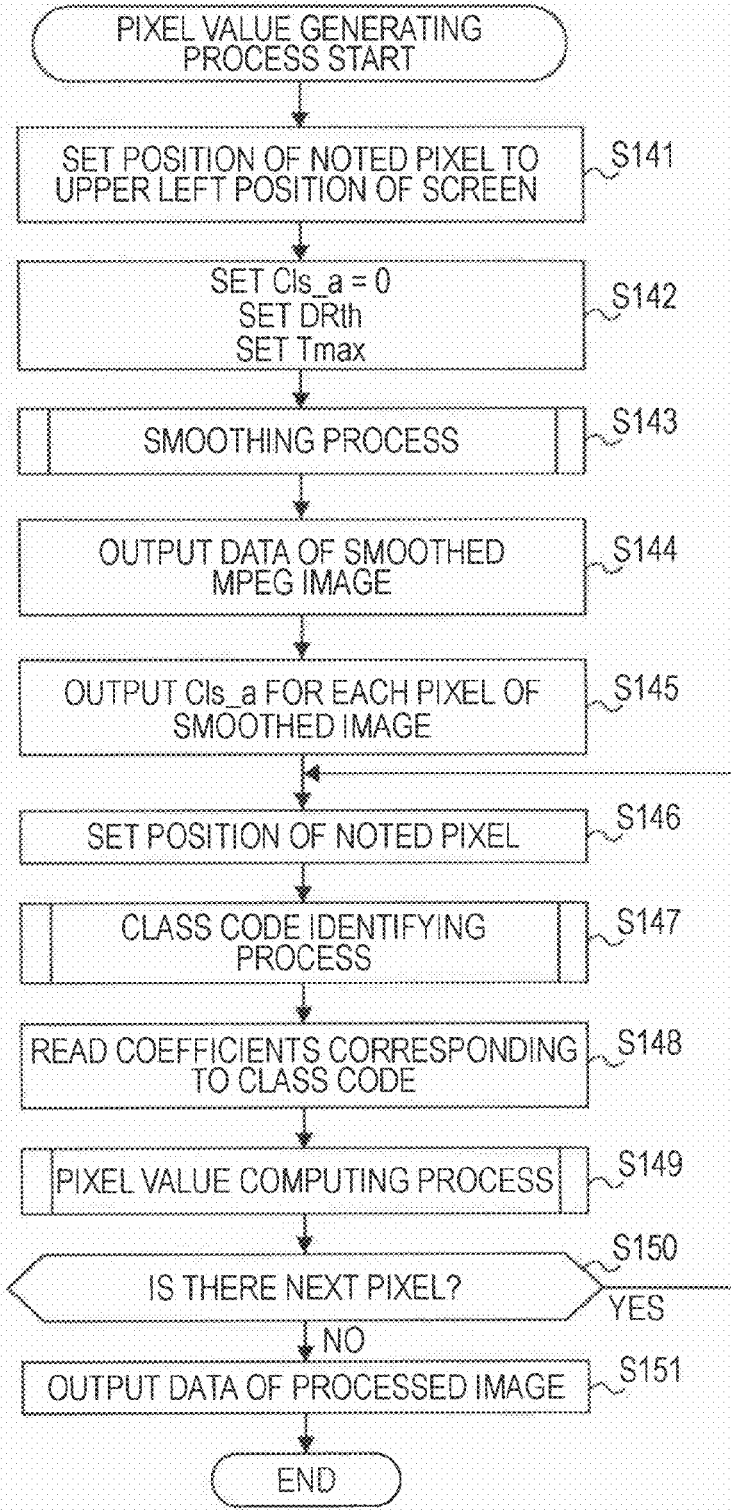

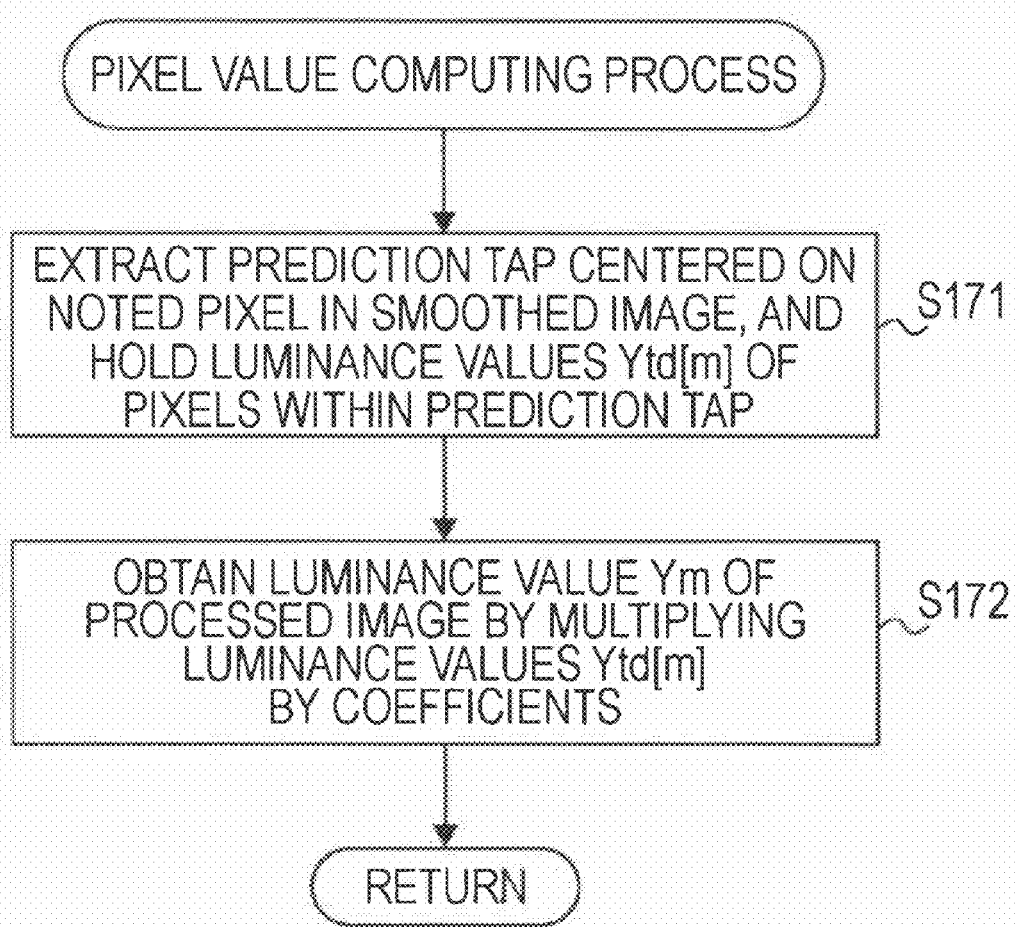

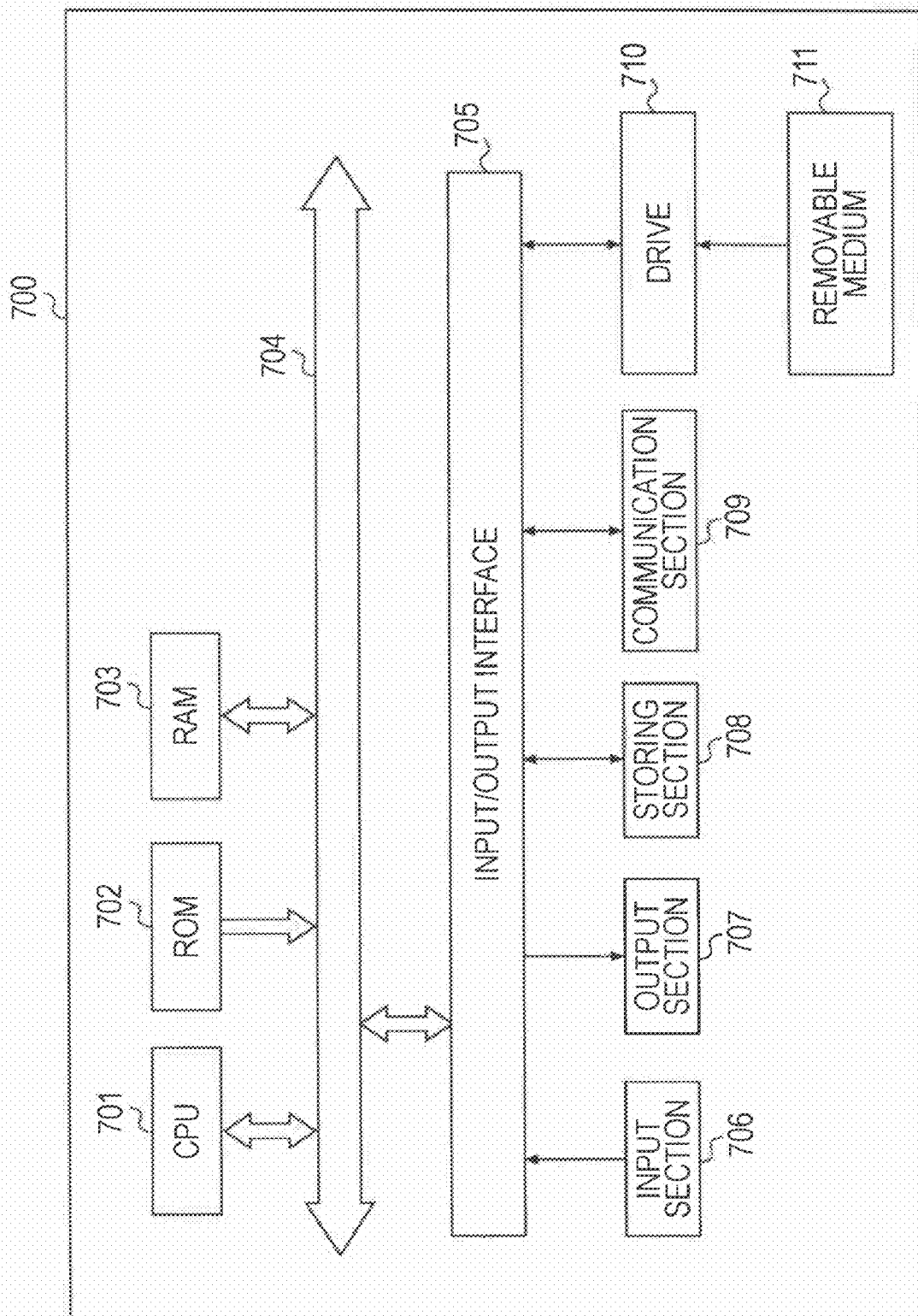

IMAGE PROCESSING DEVICE AND METHOD, LEARNING DEVICE AND METHOD, PROGRAM, AND RECORDING MEDIUM

CROSS REFERENCES TO RELATED APPLICATIONS

The present invention contains subject matter related to Japanese Patent Application JP 2007-330092 filed in the Japanese Patent Office on Dec. 21, 2007, the entire contents of which are incorporated herein by reference.

BACKGROUND OF THE INVENTION

1. Field of the Invention

The present invention relates to an image processing device and method, a learning device and method, a program, and a recording medium. More specifically, the present invention relates to an image processing device and method, a learning device and method, a program, and a recording medium which make it possible to generate an image with high perceived resolution while reducing perceived noise.

2. Description of the Related Art

For transmission, accumulation, or the like of image data, a compression/encoding process based on JPEG, MPEG, H264/AVC or the like is frequently employed. For example, in the discrete cosine transform used in MPEG or JPEG, with an 8×8 dot area as a minimum unit, the screen is compressed by removing portions having relatively little variation within the area. Thus, if the bit rate is not sufficient, it is often the case that the original image is not fully reconstructed upon decoding, and block boundaries become clearly visible, causing block noise.

In the related art, as a scheme for reducing block noise produced in a digital image that has been encoded and then decoded, for example, a method of applying a filtering between blocks (or across the entire screen) such as the H264/AVC deblocking filter is adopted.

For example, in H264/AVC deblocking filter processing, whether or not block noise is easily visible is determined from the relationship between a block boundary and pixels in the vicinity of the boundary. A filtering is applied to the vicinity of the block boundary on the basis of the determination result, thereby smoothing the pixel values of an image so that the noise does not become conspicuous.

The H264/AVC deblocking filter processing is disclosed in detail in IEEE TRANSACTIONS ON CIRCUITS AND SYSTEMS FOR VIDEO TECHNOLOGY, VOL. 13, NO. 7, JULY 2003 Adaptive Deblocking Filter Peter List, Anthony Joch, Jani Lainema, Gisle Bjontegaard, and Marta Karczewicz, and the like.

Also, a scheme also exists in which, in deblocking filter processing, the filter strength is obtained with reference to additional information such as full screen motion, bit rate, or picture size.

For example, in an encoding process based on the MPEG2 scheme, in order to impart general versatility to the encoding process and enhance the efficiency of compression by encoding, additional information for a decoding process is transmitted together with encoded image data. The additional information is inserted into the header in an MPEG2 stream and transmitted to a decoding device.

The characteristics of an image signal obtained by decoding vary greatly depending on the encoding and decoding scheme applied. For example, its physical characteristics (frequency characteristic and the like) differ greatly depending on the signal kind, such as a luminance signal, a color difference signal, or a three-color signal. This difference still remains in a decoded signal that has undergone an encoding and decoding process. Generally, in an image encoding and decoding process, it is frequently the case that the number of pixels to be encoded is reduced by introducing a spatio-temporal thinning process. The characteristics of the spatio-temporal resolution of an image differ greatly depending on the thinning method. Further, even when the difference in spatio-temporal resolution characteristics is small, image quality characteristics such as S/N, an encoding distortion, and the like vary greatly depending on the compression ratio (transmission rate) condition at the time of encoding.

The applicant has previously proposed classification adaptive processing. According to this processing, in a learning process, prediction coefficients are obtained for each class by using actual image signals (teacher and student signals) and accumulated in advance, and in the actual image transformation process, a class is obtained from an input image signal, and output pixel values are obtained by prediction computation between prediction coefficients corresponding to the class and a plurality of pixel values of the input image signal. The class is determined in accordance with the distribution or waveform of pixel values that are spatially or temporally adjacent to a pixel to be created. By computing prediction coefficients using the actual image signals, and computing the prediction coefficients for each class, various kinds of signal processing can be performed. For example, it is possible to perform processing such as a resolution creation process in which the spatio-temporal resolution is set equal to or higher than that of an input signal, interpolation of pixels thinned out by sub-sampling, noise reduction, and error correction.

There has been also proposed a technique related to digital signal processing which can enhance the accuracy of prediction by changing the extraction range or positions of a plurality of pieces of data used for classification or prediction computation, on the basis of additional information with respect to a digital information signal that has undergone an encoding and decoding process (see, for example, Japanese Unexamined Patent Application Publication No. 2001-285870).

A technique has been also proposed in which, in order to allow an interpolated pixel value close to a true value to be obtained, in a block formed by a plurality of pixels neighboring and centered around a position to be interpolated, the flatness in the vicinity of the center is detected, neighboring pixels are selected in such a way that the number of neighboring pixels to be selected at the center increases as the flatness becomes larger, and pixels to be generated are classified in accordance with the pattern of level distribution of the neighboring pixels.

SUMMARY OF THE INVENTION

However, when removing block noise, it is difficult to determine which portion of an image corresponds to block noise. For example, since H264/AVC deblocking filter processing is executed in accordance with a decoding process, blocking information used at the time of encoding in the H264/AVC scheme can be used. Thus, block boundaries can be easily identified. However, for images encoded in other schemes (for example, MPEG), a noise reduction effect may not be expected even when such processing is executed.

Also, for example, when displaying a decoded image having an aspect ratio different from that of an encoded image, even if blocking information used at the time of encoding can be used, it is difficult to identify block boundaries on the basis of that information.

While it is of course possible to smooth the entire screen to reduce perceived noise without identifying block boundaries, in this case, the smoothing diminishes the perceived detail or resolution of the image, so the entire screen appears blurred, resulting in a loss of sharpness. That is, even the amplitude of pixel luminance due to image detail or the like, which is actually not block noise, is erroneously smoothed, diminishing the perceived resolution of the image.

In the filtering process aimed at noise reduction according to the related art, the pixel value of a target pixel is obtained by assigning weighting coefficients to a plurality of pixels centered on the target pixel. However, in a case where the target pixel itself contains noise, there is a possibility that the noise component remains visible even after the filtering process.

It is desirable to enable generation of an image with high perceived resolution while reducing perceived noise.

According to an embodiment of the present invention, there is provided an image processing device which processes an input image to generate a processed image, including: smoothing means for extracting a smoothing tap and smoothing a target processing image that is the input image on the basis of pixel values within the smoothing tap, the smoothing tap being variable in size and formed by a plurality of pixels centered on each target pixel of the target processing image; class tap extracting means for extracting a class tap formed by a plurality of pixels centered on each target pixel in the smoothed target processing image; class code determining means for generating a code corresponding to a characteristic of variation of pixel values within the class tap, and determining a class code, which includes a size of the smoothing tap and the code corresponding to a characteristic of variation of pixel values; and pixel value computing means for reading tap coefficients corresponding to the determined class code from a storing section, and multiplying individual pixel values forming a prediction tap extracted from the smoothed target processing image, by the tap coefficients to calculate pixel values of the processed image.

The smoothing means may determine a size of the smoothing tap on the basis of a dynamic range of pixel values forming the smoothing tap.

The smoothing means may smooth the target processing image by calculating an average of pixel values forming the smoothing tap, and setting the average as a value of the target pixel, without assigning a weight to each of the pixel values forming the smoothing tap.

The class code determining means may generate the code corresponding to a characteristic of variation of pixel values by performing ADRC (Adaptive Dynamic Range Coding) with respect to each of pixels within the prediction tap.

The class code determining means may extract a class tap formed by a plurality of pixels centered on the target pixel and different from the prediction tap, and perform the ADRC with respect to each of pixels within the class tap.

According to an embodiment of the present invention, there is provided an image processing method for an image processing device that processes an input image to generate a processed image, including the steps of: extracting a smoothing tap and smoothing a target processing image that is the input image on the basis of pixel values within the smoothing tap, the smoothing tap being variable in size and formed by a plurality of pixels centered on each target pixel of the target processing image; extracting a class tap formed by a plurality of pixels centered on each target pixel in the smoothed target processing image; generating a code corresponding to a characteristic of variation of pixel values within the class tap, and determining a class code, which includes a size of the smoothing tap and the code corresponding to a characteristic of variation of pixel values; and reading tap coefficients corresponding to the determined class code from a storing section, and multiplying individual pixel values forming a prediction tap extracted from the smoothed target processing image, by the tap coefficients to calculate pixel values of the processed image.

According to an embodiment of the present invention, there is provided a program for causing a computer to function as an image processing device that processes an input image to generate a processed image, the image processing device including: smoothing means for extracting a smoothing tap and smoothing a target processing image that is the input image on the basis of pixel values within the smoothing tap, the smoothing tap being variable in size and formed by a plurality of pixels centered on each target pixel of the target processing image; class tap extracting means for extracting a class tap formed by a plurality of pixels centered on each target pixel in the smoothed target processing image; class code determining means for generating a code corresponding to a characteristic of variation of pixel values within the class tap, and determining a class code, which includes a size of the smoothing tap and the code corresponding to a characteristic of variation of pixel values; and pixel value computing means for reading tap coefficients corresponding to the determined class code from a storing section, and multiplying individual pixel values forming a prediction tap extracted from the smoothed target processing image, by the tap coefficients to calculate pixel values of the processed image.

According to an embodiment of the present invention, a smoothing tap is extracted and a target processing image that is an input image is smoothed on the basis of pixel values within the smoothing tap, the smoothing tap being variable in size and formed by a plurality of pixels centered on each target pixel of the target processing image; a class tap formed by a plurality of pixels centered on each target pixel in the smoothed target processing image is extracted; a code corresponding to a characteristic of variation of pixel values within the class tap is extracted, and a class code, which includes a size of the smoothing tap and the code corresponding to a characteristic of variation of pixel values, is generated; tap coefficients corresponding to the determined class code are read from a storing section, and individual pixel values forming a prediction tap extracted from the smoothed target processing image are multiplied by the tap coefficients to calculate pixel values of a processed image.

According to an embodiment of the present invention, there is provided a learning device which learns tap coefficients for processing an input image to obtain a processed image, including: smoothing means for extracting a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image; class tap extracting means for extracting a class tap formed by a plurality of pixels centered on each target pixel in the smoothed decoded image; class code determining means for generating a code corresponding to a characteristic of variation of pixel values within the class tap, and determining a class code, which includes a size of the smoothing tap and the code corresponding to a characteristic of variation of pixel values; prediction tap extracting means for extracting a prediction tap formed by a plurality of pixels centered on each target pixel in the smoothed decoded image; tap coefficient calculating means for obtaining tap coefficients that minimize an error between a result of prediction computation using the prediction tap, and a pixel value in the original image which corresponds to the target pixel, for each the class code; and tap coefficient storing means for storing the obtained tap coefficients into a storing section for each the class code.

The smoothing means may determine a size of the smoothing tap on the basis of a dynamic range of pixel values forming the smoothing tap.

The smoothing means may smooth the decoded image by calculating an average of pixel values forming the smoothing tap, and setting the average as a value of the target pixel, without assigning a weight to each of the pixel values forming the smoothing tap.

The class code determining means may generate the code corresponding to a characteristic of variation of pixel values by performing ADRC (Adaptive Dynamic Range Coding) with respect to each of pixels within the prediction tap.

The class code determining means may extract a class tap formed by a plurality of pixels centered on the target pixel and different from the prediction tap, and perform the ADRC with respect to each of pixels within the class tap.

According to an embodiment of the present invention, there is provided a learning method for a learning device that learns tap coefficients for processing an input image to obtain a processed image, including the steps of: extracting a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image; extracting a class tap formed by a plurality of pixels centered on each target pixel in the smoothed decoded image; generating a code corresponding to a characteristic of variation of pixel values within the class tap, and determining a class code, which includes a size of the smoothing tap and the code corresponding to a characteristic of variation of pixel values; extracting a prediction tap formed by a plurality of pixels centered on each target pixel in the smoothed decoded image; obtaining tap coefficients that minimize an error between a result of prediction computation using the prediction tap, and a pixel value in the original image which corresponds to the target pixel, for each the class code; and storing the obtained tap coefficients into a storing section for each the class code.

According to an embodiment of the present invention, there is provided a program for causing a computer to function as a learning device that learns tap coefficients for obtaining a processed image by processing an input image, the learning device including: smoothing means for extracting a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image; class tap extracting means for extracting a class tap formed by a plurality of pixels centered on each target pixel in the smoothed decoded image; class code determining means for generating a code corresponding to a characteristic of variation of pixel values within the class tap, and determining a class code, which includes a size of the smoothing tap and the code corresponding to a characteristic of variation of pixel values; prediction tap extracting means for extracting a prediction tap formed by a plurality of pixels centered on each target pixel in the smoothed decoded image; tap coefficient calculating means for obtaining tap coefficients that minimize an error between a result of prediction computation using the prediction tap, and a pixel value in the original image which corresponds to the target pixel, for each the class code; and tap coefficient storing means for storing the obtained tap coefficients into a storing section for each the class code.

According to an embodiment of the present invention, a smoothing tap is extracted and a decoded image, which is obtained by compressing/encoding and decoding an original image, is smoothed on the basis of pixel values within the smoothing tap, the smoothing tap being variable in size and formed by a plurality of pixels centered on each target pixel of the decoded image; a class tap formed by a plurality of pixels centered on each target pixel in the smoothed decoded image is extracted; a code corresponding to a characteristic of variation of pixel values within the class tap is extracted, and a class code, which includes a size of the smoothing tap and the code corresponding to a characteristic of variation of pixel values, is determined; a prediction tap formed by a plurality of pixels centered on each target pixel in the smoothed decoded image is extracted; tap coefficients that minimize an error between a result of prediction computation using the prediction tap, and a pixel value in the original image which corresponds to the target pixel, are extracted for each the class code; and the obtained tap coefficients are stored into a storing section for each the class code.

According to an embodiment of the present invention, it is possible to generate an image with high perceived resolution while reducing perceived noise.

BRIEF DESCRIPTION OF THE DRAWINGS

FIG. 2 is a block diagram showing an example of the detailed configuration of a coefficient generation processing section in FIG. 1;

FIG. 3 is a block diagram showing an example of the detailed configuration of a pixel value generation processing section in FIG. 1;

FIG. 4 is a flowchart illustrating a class-specific coefficient generating process;

FIG. 5 is a flowchart illustrating a smoothing process;

FIG. 11 is a flowchart illustrating a class code-specific determinant generating process;

FIG. 12 is a flowchart illustrating a determinant computing process;

FIG. 13 is a flowchart illustrating a pixel value generating process;

FIG. 14 is a flowchart illustrating a pixel value computing process;

FIG. 19 is a block diagram showing an example of the configuration of a personal computer.

DESCRIPTION OF THE PREFERRED EMBODIMENTS

Before describing an embodiment of the present invention, the correspondence between the features of the present invention and embodiments disclosed in the specification or drawings is discussed below. This description is intended to assure that an embodiment(s) supporting the present invention are described in the specification or drawings. Thus, even if an embodiment in the following description is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

Figure 6:
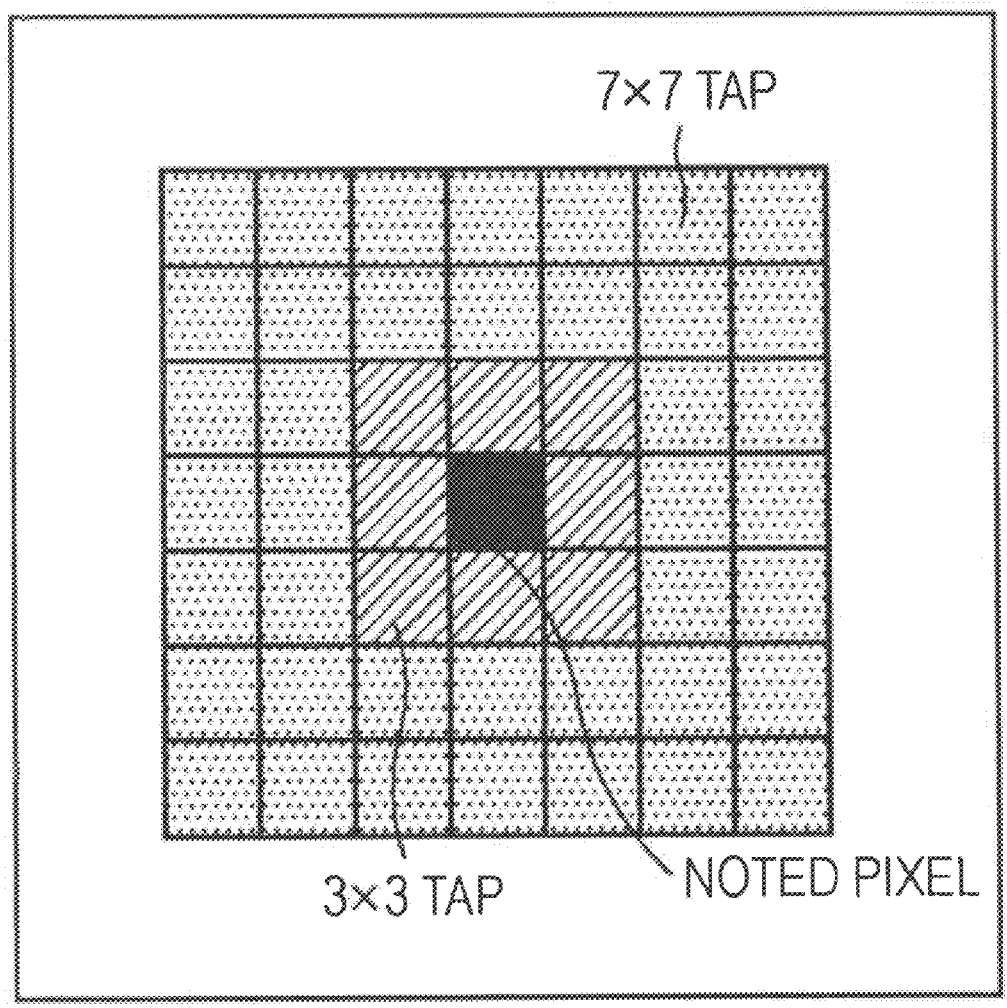
FIG. 6 is a view showing an example of a tap used in a smoothing process.
Figure 7:
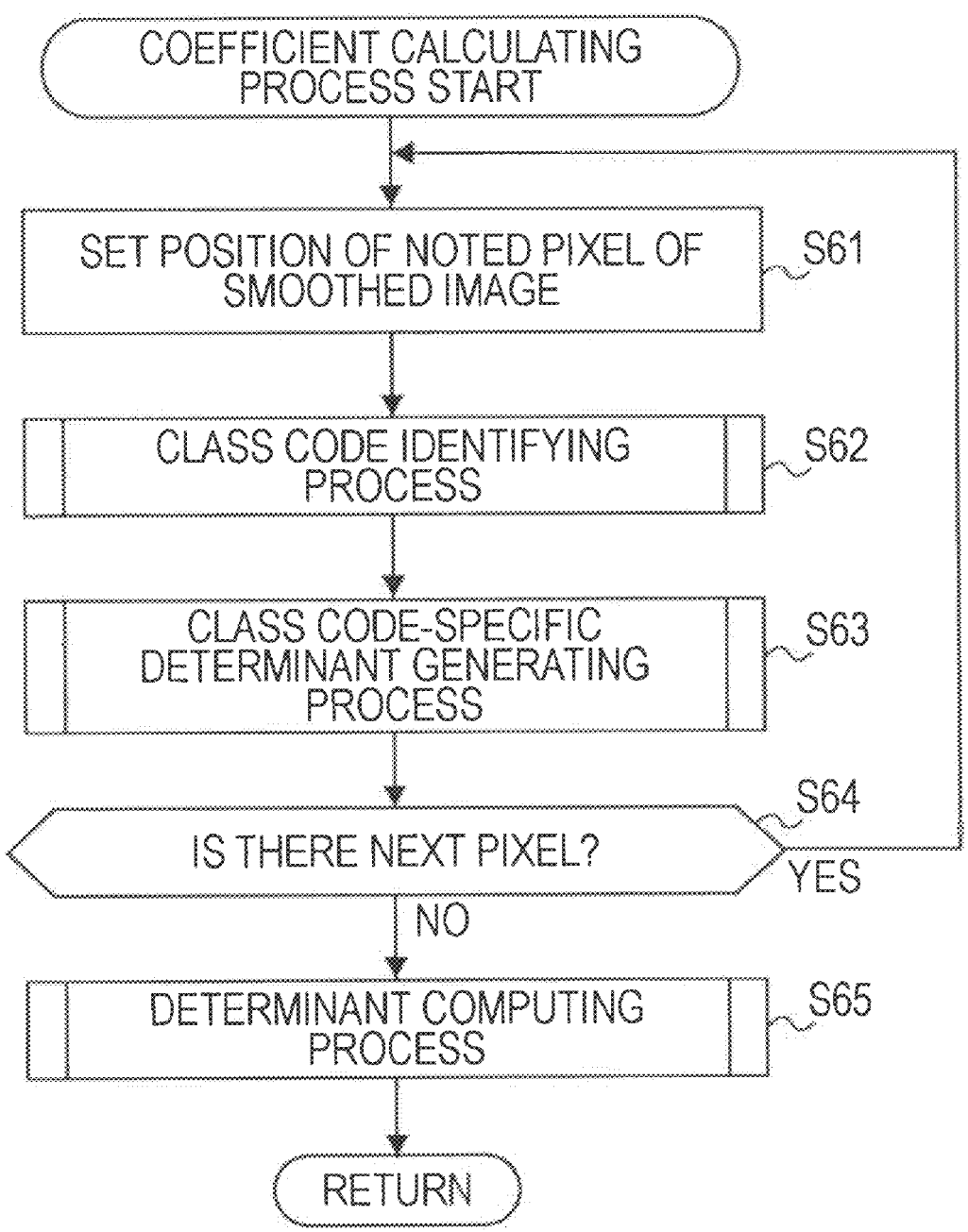
FIG. 7 is a flowchart illustrating a coefficient calculating process.
Figure 8:
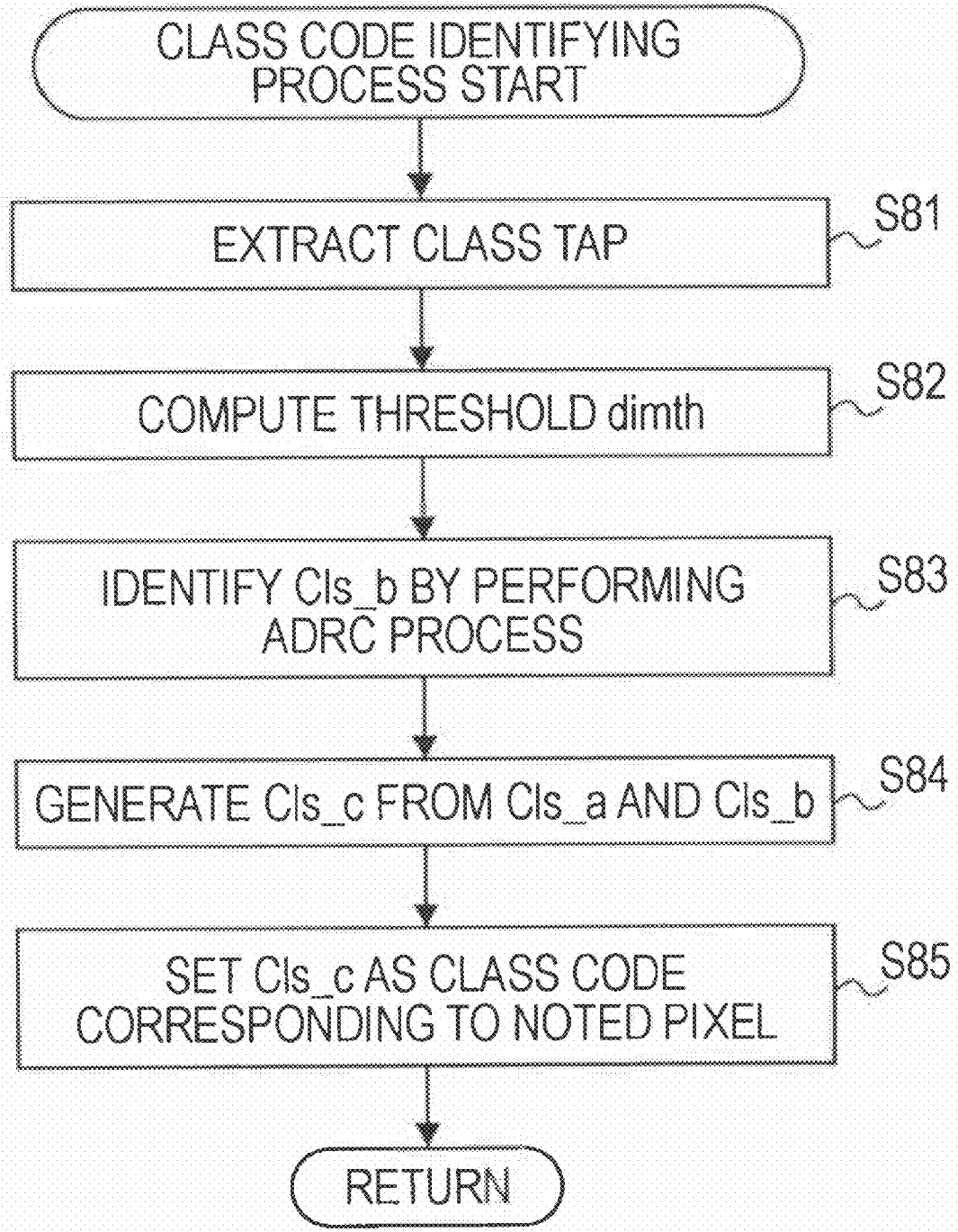
FIG. 8 is a flowchart illustrating a class code identifying process.

According to an embodiment of the present invention, there is provided an image processing device which processes an input image to generate a processed image, including: smoothing means (for example, a smoothing processing section 72 in FIG. 3) for extracting a smoothing tap (for example, a tap in FIG. 6) and smoothing a target processing image (for example, an MPEG image) that is the input image on the basis of pixel values within the smoothing tap, the smoothing tap being variable in size and formed by a plurality of pixels centered on each target pixel of the target processing image; class tap extracting means (for example, a classification luminance value computing section 73 in FIG. 3 executing the processing of step S81 in FIG. 8) for extracting a class tap formed by a plurality of pixels centered on each target pixel in the smoothed target processing image; class code determining means (for example, a classification luminance value computing section 73 in FIG. 3 executing the processing of step S62 in FIG. 7) for generating a code (for example, a code Cls_b) corresponding to a characteristic of variation of pixel values within the class tap, and determining a class code, which includes a size of the smoothing tap and the code corresponding to a characteristic of variation of pixel values; and pixel value computing means (for example, a classification luminance value computing section 73 in FIG. 3 executing the processing of steps S148 and S149 in FIG. 13) for reading tap coefficients corresponding to the determined class code from a storing section, and multiplying individual pixel values forming a prediction tap extracted from the smoothed target processing image, by the tap coefficients to calculate pixel values of the processed image.

According to an embodiment of the present invention, there is provided an image processing method for an image processing device that processes an input image to generate a processed image, including the steps of: extracting a smoothing tap (for example, a tap in FIG. 6) and smoothing a target processing image (for example, an MPEG image) that is the input image on the basis of pixel values within the smoothing tap, the smoothing tap being variable in size and formed by a plurality of pixels centered on each target pixel of the target processing image (for example, the processing of S143 in FIG. 13); extracting a class tap formed by a plurality of pixels centered on each target pixel in the smoothed target processing image (for example, the processing of step S81 in FIG. 8); generating a code (for example, a code Cls_b) corresponding to a characteristic of variation of pixel values within the class tap, and determining a class code, which includes a size of the smoothing tap and the code corresponding to a characteristic of variation of pixel values (for example, the processing of step S62 in FIG. 7); and reading tap coefficients corresponding to the determined class code from a storing section, and multiplying individual pixel values forming a prediction tap extracted from the smoothed target processing image, by the tap coefficients to calculate pixel values of the processed image (for example, the processing of steps S148 and S149 in FIG. 13).

Figure 9:
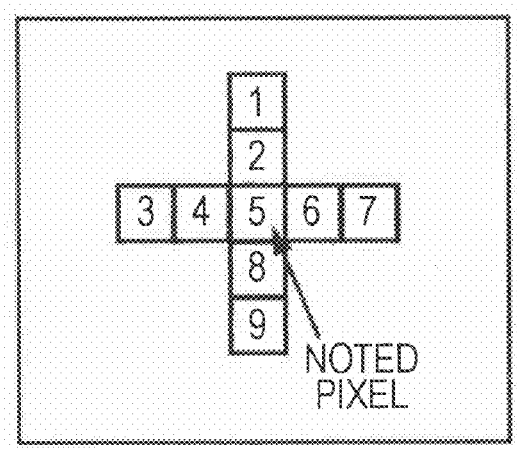
FIG. 9 is a view showing an example of a class tap or a prediction tap.

According to an embodiment of the present invention, there is provided a learning device which learns tap coefficients for processing an input image to obtain a processed image, including: smoothing means (for example, a smoothing processing section 52 in FIG. 2) for extracting a smoothing tap (for example, a tap in FIG. 6) and smoothing a decoded image (for example, an MPEG image), which is obtained by compressing/encoding and decoding an original image, on the basis of pixel values within the smoothing tap, the smoothing tap being variable in size and formed by a plurality of pixels centered on each target pixel of the decoded image; class tap extracting means (for example, a classification coefficient generating section 53 in FIG. 2 executing the processing of step S81 in FIG. 8) for extracting a class tap formed by a plurality of pixels centered on each target pixel in the smoothed decoded image; class code determining means (for example, a classification coefficient generating section 53 in FIG. 2 executing the processing of step S62 in FIG. 7) for generating a code (for example, a code Cls_b) corresponding to a characteristic of variation of pixel values within the class tap, and determining a class code, which includes a size of the smoothing tap and the code corresponding to a characteristic of variation of pixel values; prediction tap extracting means (for example, a classification coefficient generating section 53 in FIG. 2 executing the processing of step S101 in FIG. 9) for extracting a prediction tap formed by a plurality of pixels centered on each target pixel in the smoothed decoded image; tap coefficient calculating means (for example, a classification coefficient generating section 53 in FIG. 2 executing the processing of step S63 in FIG. 7, and the processing of steps S121 to S123 in FIG. 12) for obtaining tap coefficients that minimize an error between a result of prediction computation using the prediction tap, and a pixel value in the original image which corresponds to the target pixel, for each the class code; and tap coefficient storing means (for example, a classification coefficient generating section 53 in FIG. 2 executing the processing of step S124 in FIG. 12) for storing the obtained tap coefficients into a storing section (for example, a coefficient storing section 54 in FIGS. 2 and 3) for each the class code.

According to an embodiment of the present invention, there is provided a learning method for a learning device that learns tap coefficients for processing an input image to obtain a processed image, including the steps of: extracting a smoothing tap (for example, a tap in FIG. 6) and smoothing a decoded image (for example, an MPEG image), which is obtained by compressing/encoding and decoding an original image, on the basis of pixel values within the smoothing tap, the smoothing tap being variable in size and formed by a plurality of pixels centered on each target pixel of the decoded image (for example, the processing of step S13 in FIG. 4); extracting a class tap formed by a plurality of pixels centered on each target pixel in the smoothed decoded image (for example, the processing of step S81 in FIG. 8); generating a code (for example, a code Cls_b) corresponding to a characteristic of variation of pixel values within the class tap, and determining a class code, which includes a size of the smoothing tap and the code corresponding to a characteristic of variation of pixel values (for example, the processing of step S62 in FIG. 7); extracting a prediction tap formed by a plurality of pixels centered on each target pixel in the smoothed decoded image (for example, the processing of step S101 in FIG. 9); obtaining tap coefficients that minimize an error between a result of prediction computation using the prediction tap, and a pixel value in the original image which corresponds to the target pixel, for each the class code (for example, the processing of step S63 in FIG. 7, and the processing of steps S121 to S123 in FIG. 12); and storing the obtained tap coefficients into a storing section (for example, a coefficient storing section 54 in FIGS. 2 and 3) for each the class code (for example, the processing of step S124 in FIG. 12).

Hereinbelow, an embodiment of the present invention will be described with reference to the drawings.

Figure 1:
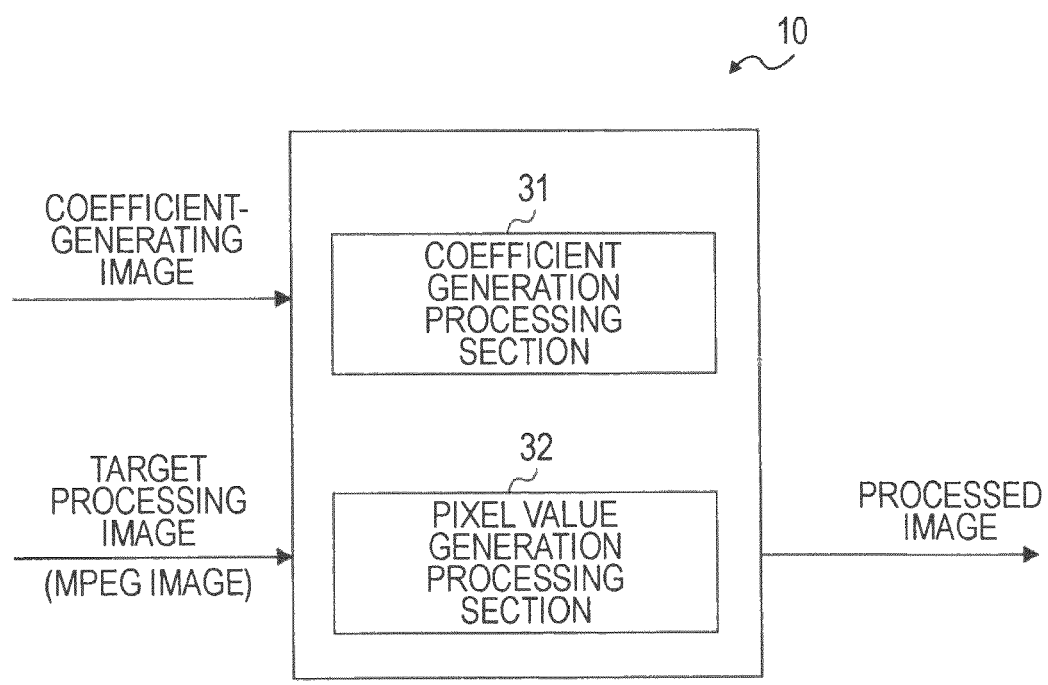
FIG. 1 is a block diagram showing an example of the configuration of an image processing device according to an embodiment of the present invention.

FIG. 1 is a block diagram showing an example of the configuration of an image processing device 10 according to an embodiment of the present invention. The image processing device 10 is configured to remove noise such as block noise, and generate an image with high perceived resolution, on the basis of an image obtained by decoding an image that is compressed and encoded in a predetermined compression and encoding scheme such as the MPEG (Motion Picture Expert Group), for example.

The image processing device 10 in FIG. 1 includes a coefficient generation processing section 31 and a pixel value generation processing section 32.

The coefficient generation processing section 31 is configured to generate coefficients used in the processing by the pixel value generation processing section 32, on the basis of the data of an inputted coefficient-generating image. In this case, the coefficient-generating image is an image that has not been compressed and encoded.

The pixel value generation processing section 32 is configured to perform a smoothing process for removing noise such as block noise with respect to the data of an inputted processing target image, and perform computations using the coefficients generated by the coefficient generation processing section 31 with respect to individual pixels forming the thus smoothed image, thereby generating pixel values forming an image from which noise such as block noise is removed and which has a high level of perceived resolution.

The data of an image formed by pixels whose pixel values are generated in this way is outputted from the image processing device 10 as the data of a processed image.

The coefficient generation processing section 31 and the pixel value generation processing section 32 may not necessarily be integrated with each other but may be configured as separate devices.

FIG. 2 is a block diagram showing an example of the detailed configuration of the coefficient generation processing section 31. As shown in FIG. 2, the data of an original image as an image that has not been compressed and encoded is inputted to the coefficient generation processing section 31. In this case, the original image corresponds to the coefficient-generating image in FIG. 1. The inputted original image is supplied to an encoder/decoder 51 and a classification coefficient generating section 53.

The encoder/decoder 51 generates data of an image that is obtained by compressing and encoding an original image in a predetermined compression and encoding scheme, and further decoding the compressed/encoded image. In this example, the encoder/decoder 51 compresses and encodes an original image in the MPEG scheme, and further decodes the compressed/encoded image. The image thus compressed and encoded and then decoded contains, for example, noise such as block noise generated by the processing of compression, encoding, and decoding in MPEG.

As will be described later, the smoothing processing section 52 performs a smoothing process with respect to the data of an MPEG image (image that has been compressed and encoded and then decoded) outputted from the encoder/decoder 51. Then, the smoothing processing section 52 supplies the smoothed MPEG image data, and a code indicating the tap length of a tap used in the smoothing process, to the classification coefficient generating section 53.

The classification coefficient generating section 53 computes an ADRC code by performing an ADRC (Adaptive Dynamic Range Coding) process with respect to each individual pixel of the smoothed MPEG image, and identifies a class code corresponding to each individual pixel on the basis of the code indicative of tap length supplied from the smoothing processing section 52, and the ADRC code.

Also, with each individual pixel of the smoothed MPEG image as a target pixel, the classification coefficient generating section 53 generates a determinant expressing the relationship between the pixel values of pixels of a prediction tap centered on the target pixel, and the pixel value of a pixel in the original image which corresponds to the target pixel, for each class code.

Then, the classification coefficient generating section 53 computes the inverse matrix of the above-described determinant to thereby calculate coefficients by which the pixel values of the pixels of the prediction tap centered on the target pixel in the smoothed MPEG image are multiplied and which are used for obtaining the pixel value of the pixel in the original image which corresponds to the target pixel. The coefficients are calculated for each of the above-described class codes.

The coefficients calculated (generated) by the classification coefficient generating section 53 are stored into a coefficient storing section 54 in association with class codes.

FIG. 3 is a block diagram showing an example of the detailed configuration of the pixel value generation processing section 32. As shown in FIG. 3, the data of an MPEG image (image that has been compressed and encoded and then decoded) is inputted to the pixel value generation processing section 32. In this case, the MPEG image corresponds to the target processing image in FIG. 1, and contains, for example, noise such as block noise generated by the processing of compression, encoding, and decoding in MPEG.

The MPEG image is inputted to a smoothing processing section 72, and undergoes a smoothing process as will be described later. Data of a smoothed MPEG image is thus outputted. While the smoothed MPEG image is removed of noise such as block noise, the smoothing diminishes the perceived detail or resolution of the image, so the entire screen appears blurred and sharpness is lost, resulting in an image with lower perceived resolution.

Also, the smoothing processing section 72 is configured to supply the data of the smoothed MPEG image, and a code expressing the tap length of a tap used in the smoothing process, to a classification luminance value computing section 73.

It should be noted that the smoothing processing section 72 of the pixel value generation processing section 32 and the smoothing processing section 52 of the coefficient generation processing section 31 may be configured as the same functional block.

The classification luminance value computing section 73 calculates an ADRC code by performing an ADRC process with respect to each individual pixel of the smoothed MPEG image supplied from the smoothing processing section 72, and identifies a class code corresponding to each individual pixel on the basis of the code indicative of tap length which is supplied from the smoothing processing section 72, and the ADRC code.

Then, the classification luminance value computing section 73 reads coefficients corresponding to the class code of the target pixel from the coefficient storing section 54, and multiples the pixel values of pixels of a prediction tap centered on the target pixel of the smoothed MPEG image by those coefficients, thereby computing the pixel values of individual pixels of a processed image.

Next, a description will be given of a class-specific coefficient generating process performed by the image processing device 10 according to an embodiment of the present invention, with reference to the flowchart in FIG. 4. This process is executed by the coefficient generation processing section 31 when the data of a coefficient-generating image (original image) is inputted, for example.

In step S11, the smoothing processing section 52 sets the position of a target pixel. In this case, the position of a target pixel is set to an upper left position of the screen of an MPEG image, which is obtained by compressing and encoding an original image by the encoder/decoder 51 and further decoding the compressed/encoded image.

In step S12, the smoothing processing section 52 sets a code Cls_a, which corresponds to the tap size used in the smoothing process of the MPEG image, to "0", and sets a threshold DRth of the dynamic range of pixels within a tap, and a maximum value Tmax of the tap size.

In step S13, the smoothing processing section 52 executes a smoothing process that will be described later with reference to FIG. 5.

Now, referring to the flowchart in FIG. 5, a description will be given of the details of the smoothing process in step S13 in FIG. 4.

In step S31, the smoothing processing section 52 initializes a variable Ta indicating a tap size. In this case, for example, the size of a tap formed by 9 (=3×3) pixels centered on a target pixel is set as the initial value. As will be described later, the tap size initialized at this time is the tap size of a tap used for smoothing the value (luminance value) of the target pixel.

In step S32, the smoothing processing section 52 determines whether or not the tap size Ta exceeds the maximum value Tmax. If it is determined that the tap size Ta does not exceed the maximum value Tmax, the process proceeds to step S33.

In step S33, the smoothing processing section 52 calculates the dynamic range DR_1 of pixel values within a tap of the tap size Ta centered on the target pixel. In the present case, the dynamic range DR_1 is calculated on the basis of the largest and smallest ones of the pixel values of pixels within the tap formed by 9 pixels centered on the target pixel.

In step S34, the smoothing processing section 52 determines whether or not the dynamic range DR_1 is less than the threshold DRth. If it is determined that the dynamic range DR_1 is less than the threshold DRth, the process proceeds to step S35.

In step S35, the smoothing processing section 52 increments the code Cls_a, and in step S36, the smoothing processing section 52 enlarges the tap size Ta.

At this time, the tap size is enlarged as shown in FIG. 6, for example. In FIG. 6, the pixel at the position indicated by a black square is the target pixel. In this example, the tap size is enlarged from a rectangular tap formed by 9 (=3×3) pixels centered on the target pixel, to a rectangular tap formed by 49 (=7×7) pixels centered on the target pixel. It should be noted that the tap used in the smoothing process is not limited to a rectangular one, nor is the tap size limited to 9 (=3×3) pixels or 49 (=7×7) pixels.

Since the tap size is enlarged in this way, the number of pixels within the tap increases, so there is a high possibility of the value of the dynamic range DR_1 becoming larger.

Then, the process returns to step S32, and the processing from step S32 to step S36 is repeatedly executed. That is, the tap size is enlarged until the tap size exceeds the maximum value, or the dynamic range of the values of pixels within the tap becomes equal to or greater than the threshold.

If it is determined in step S32 that the tap size Ta exceeds the maximum value Tmax, or if it is determined in step S34 that the dynamic range DR_1 is not less than the threshold DRth, the process proceeds to step S37.

In step S37, the smoothing processing section 52 stores the position of the target pixel and the code Cls_a in association with each other into an internal memory or the like. It should be noted that the code Cls_a is a code indicating the tap size (tap length) used in the smoothing process, and is stored as, for example, a 2-bit code.

In step S38, the smoothing processing section 52 sets the pixel value of the target pixel as the average of pixel values within the tap of the tap size Ta. That is, the pixel value of the target pixel is smoothed through this process.

It should be noted that the related art employs a scheme in which pixel values are smoothed by a filter such as a Gaussian filter that assigns a large weight to the target pixel. However, according to the related art scheme, in a case where, for example, a noise component is superimposed on the target pixel, the noise component often does not disappear even after smoothing. Accordingly, in an embodiment of the present invention, smoothing is done by computing the average of pixel values, without assigning weights to pixels within a tap.

In step S39, the smoothing processing section 52 moves the position of a target pixel in the raster direction. At this time, for example, the pixel position is moved by one pixel to the right in the horizontal direction of the screen.

In step S40, the smoothing processing section 52 determines whether or not the position of a target pixel is outside a horizontal image frame. If it is determined that the position of the target pixel is inside the horizontal image frame, the process returns to step S31, and the processing of step S31 to step S39 is repeatedly executed with respect to a new target pixel.

On the other hand, if it is determined in step S40 that the position of the target pixel is outside the horizontal image frame, the process proceeds to step S41, and the smoothing processing section 52 moves the position of a target pixel down by one line in the vertical direction and to the left of the screen.

In step S42, the smoothing processing section 52 determines whether or not the position of a target pixel is outside a vertical image frame. If it is determined that the position of the target pixel is inside the vertical image frame, the process returns to step S31, and the processing of step S31 to step S41 is repeatedly executed with respect to a new target pixel.

If it is determined in step S42 that the position of the target pixel is outside the vertical image frame, the smoothing process ends.

Returning to FIG. 4, after the processing of step S12, in step S14, the smoothing processing section 52 outputs the data of the smoothed MPEG image. The data outputted at this time corresponds to the smoothed MPEG image in FIG. 2.

In step S15, the smoothing processing section 52 outputs the code Cls_a, which is stored through the processing of step S37, in association with information indicating the position of the target pixel. Each such code Cls_a outputted at this time corresponds to the code indicative of tap length in FIG. 2.

In step S16, the classification coefficient generating section 53 executes a coefficient calculating process that will be described later with reference to FIG. 7.

Now, referring to the flowchart in FIG. 7, a description will be given of the details of the coefficient calculating process in step S16 in FIG. 4.

In step S61, the classification coefficient generating section 53 sets the position of a target pixel within the smoothed MPEG image outputted in the processing of step S14. For example, as the first target pixel, a pixel at an upper left position of the screen of the smoothed MPEG image is set as the target pixel.

In step S62, the classification coefficient generating section 53 executes a class code identifying process that will be described later with reference to FIG. 8. Accordingly, an ADRC process is performed with respect to each individual pixel of the smoothed MPEG image to calculate an ADRC code, and a class code corresponding to each individual pixel is identified on the basis of the code Cls_a (code indicative of tap length) outputted in the processing of step S15, and the ADRC code.

In step S63, the classification coefficient generating section 53 executes a class code-specific determinant generating process that will be described later with reference to FIG. 11. Thus, with each individual pixel of the smoothed MPEG image as a target pixel, a determinant expressing the relationship between the pixel values of pixels of a predicted tap centered on the target pixel, and the pixel value of a pixel in the original image which corresponds to the target pixel, is generated for each class code.

In step S64, the classification coefficient generating section 53 determines whether or not there is a next pixel. If it is determined that there is a next pixel, the process returns to step S61. Then, in step S61, the next pixel is set as the target pixel. In this way, the position of the target pixel moves in, for example, the raster order within the smoothed MPEG image.

Further, as described above, the class code of each individual target pixel is identified in step S62, a determinant expressing the relationship between the pixel values of pixels of a prediction tap centered on each target pixel, and the pixel value of a pixel in the original image which corresponds to the target pixel is generated, and each such determinant is added progressively as a class code-specific determinant in step S63.

If it is determined in step S64 that there is no next pixel, that is, after the processing of steps S61 to S63 has been executed with all the pixels forming the smoothed MPEG image set as target pixels, the process proceeds to step S65.

In step S65, the classification coefficient generating section 53 executes a determinant computing process that will be described later with reference to FIG. 12. Accordingly, the inverse matrix of the above-described determinant is computed to calculate coefficients by which the pixel values of pixels of a prediction tap centered on each target pixel of the smoothed MPEG image are multiplied and which are used for obtaining the pixel value of a pixel in the original image which corresponds to the target pixel. The calculated coefficients are stored into the coefficient storing section 54 in association with class codes.

Next, referring to the flowchart in FIG. 8, a description will be given of the class code identifying process in step S62 of FIG. 7.

In step S81, the classification coefficient generating section 53 extracts a class tap centered on the target pixel set in the processing of step S61. At this time, for example, as shown in FIG. 9, a cross-shaped tap formed by 9 pixels centered on the target pixel is extracted from the smoothed MPEG image. As will be described later, the class tap is a tap used for classifying the characteristic of variation of the values of a plurality of pixels centered on the target pixel.

It should be noted that in the example of FIG. 9, to allow discrimination between individual pixels forming the class tap, numbers "1" to "9" are assigned to the positions of individual pixels. In the present case, the pixel at the position of the number "5" is the target pixel.

In step S82, the classification coefficient generating section 53 computes a threshold dimth used in an ADRC process that is to be executed thereafter. The threshold dimth is computed by Equation (1).

$$\text{dimth} = Dr\_c/2 + Mic\_c \quad (1)$$

Dr_c denotes the dynamic range of the values of pixels within the class tap extracted in step S81, and Min_c denotes the smallest one of the values of pixels within the class tap extracted in step S81.

In step S83, by using the threshold obtained as a result of the processing of step S82, the classification coefficient generating section 53 identifies a code Cls_b by performing an ADRC process with respect to the pixels forming the class tap extracted in step S81 as will be described later.

Figure 10:
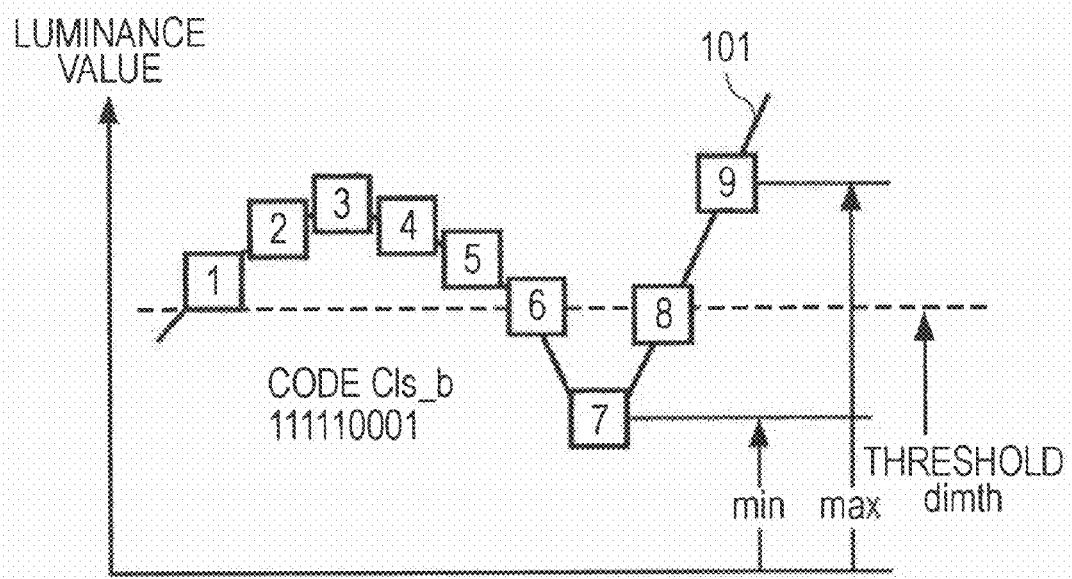
FIG. 10 is a diagram illustrating a code generated by an ADRC process.

At this time, for example, a process as shown in FIG. 10 is performed to identify the code Cls_b. FIG. 10 is a graph showing, for example, the values of the individual pixels of the class tap shown in FIG. 9 as a waveform 101, with the horizontal axis representing pixel position, and the vertical axis representing pixel value. The numerals "1" to "9" enclosed by squares shown in FIG. 9 indicate the plotted points of the values of pixels at the positions assigned the numerals "1" to "9" in FIG. 9.

In the example of FIG. 10, the value of the pixel corresponding to the number "9" is the largest (max), and the value of the pixel corresponding to the number "7" is the smallest (min). The position indicated by the dotted line in FIG. 10 is the threshold dimth obtained in the processing of step S82. In the present case, the value of the pixel corresponding to the number "7" is the smallest, so this value corresponds to Min_c in Equation (1).

Further, in the ADRC process, it is determined whether or not each individual pixel value exceeds the threshold dimth. If the pixel value exceeds the threshold dimth, a bit code "1" is set for the corresponding pixel, and if the pixel value does not exceed the threshold dimth, a bit code "0" is set for the corresponding pixel.

In the example of FIG. 10, when the bit codes of the pixels corresponding to the numbers "1" and "9" are written successively, this results in a 9-bit code "111110001". In step S84, this 9-bit code is identified as the code Cls_b. Thus, the code Cls_b is a code indicating the characteristic of the waveform of variation in pixel values within a class tap.

Returning to FIG. 8, in step S84, the classification coefficient generating section 53 acquires a code Cls_a which is the code Cls_a outputted in the processing of step S15 and corresponds to the target pixel being currently set through the processing of step S61, and generates a class code Cls_c from the code Cls_a and the code Cls_b identified in step S83.

For example, if the code Cls_a is "01", and the code Cls_b is "111110001", the class code Cls_c is set as an 11-bit code "01111110001".

In step S85, the classification coefficient generating section 53 sets the class code Cls_c as a class code corresponding to the target pixel.

In this way, a class code is identified. Thus, the class code is obtained as a code that indicates, for each individual target pixel within a smoothed MPEG image, the tap length used in the smoothing process, and the characteristic of the waveform of variation in pixel values within a class tap. If a class code includes 11 bits, classification into a maximum of 2048 ($=2^{11}$) patterns is possible.

Next, referring to the flowchart in FIG. 11, a description will be given of a class code-specific determinant generating process in step S63 in FIG. 7.

In step S101, the classification coefficient generating section 53 extracts a prediction tap centered on the target pixel set in the processing of step S61 in a smoothed MPEG image. A prediction tap is a tap which is made up of pixels of a smoothed MPEG image and is used for generating the pixels of a processed image.

At this time, for example, a cross-shaped tap made up of 9 pixels centered on the target pixel such as one described above with reference to FIG. 9 may be extracted as the prediction tap, or a tap different from that in FIG. 9 may be extracted as the prediction tap. That is, the prediction tap may be the same as the class tap, or may be different from the class tap. It should be noted that even in a case where the prediction tap is different from the class tap, the number of pixels of the prediction tap is preferably set equal to the number of pixels of the class tap.

In step S101, the classification coefficient generating section 53 holds the luminance values Ytd[m] of pixels within the prediction tap. If the number of pixels (tap length) in the prediction tap is Ld, then m=(0, 1, . . . Ld), and luminance values Ytd[0], Ytd[2], . . . Ytd[Ld] are held. The numbers "0" to "Ld" indicate the positions of pixels within the prediction tap.

In step S102, the classification coefficient generating section 53 extracts a pixel in the original image which corresponds to the target pixel, and holds the luminance value Yt of the extracted pixel.

In step S103, the classification coefficient generating section 53 generates a determinant expressing the relationship between the luminance values Ytd[m] and the luminance value Yt. For example, a determinant as indicated by Equation (2) is generated.

$$\begin{bmatrix} \sum Y_{td}[0]Y_{td}[0] & \sum Y_{td}[0]Y_{td}[1] & \cdots & \sum Y_{td}[0]Y_{td}[Ld] \\ \sum Y_{td}[1]Y_{td}[0] & \sum Y_{td}[1]Y_{td}[1] & \cdots & \sum Y_{td}[1]Y_{td}[Ld] \\ \vdots & \ddots & & \vdots \\ \sum Y_{td}[Ld]Y_{td}[0] & \sum Y_{td}[1]Y_{td}[Ld] & \cdots & \sum Y_{td}[Ld]Y_{td}[Ld] \end{bmatrix} \quad (2)$$

-continued $$\begin{bmatrix} coef[0][cls] \\ coef[1][cls] \\ \vdots \\ coef[Ld][cls] \end{bmatrix} = \begin{bmatrix} \sum Y_t Y_{td}[0] \\ \sum Y_t Y_{td}[1] \\ \vdots \\ \sum Y_t Y_{td}[Ld] \end{bmatrix}$$

In this case, [cls] indicates each individual class code.

In step S104, the classification coefficient generating section 53 holds the determinant generated in the processing of step S103 as a determinant associated with the class code Cls_c identified in the processing of step S62.

It should be noted that since the class code-specific determinant generating process in FIG. 11 is executed for each of target pixels, the determinant as indicated by Equation (2) is generated for each of the pixels of a smoothed MPEG image. For example, if the same class code is set for a plurality of target pixels, a plurality of determinants are generated in association with one class code. In this case, in the processing of step S104, determinants are added progressively.

That is, the luminance values Ytd[m] and the luminance values Yt obtained in association with target pixels having the same class code are added progressively by $\Sigma$ in the determinant of Equation (2), so determinants are added progressively up to the number of target pixels having the same class code.

Next, referring to the flowchart in FIG. 12, a description will be given of the details of the determinant computing process in step S65 of FIG. 7. This process is a process for obtaining coefficients coef[0][cls] to coef[Ld][cls] in Equation (2) described above. That is, by using the luminance values of pixels of a plurality of prediction taps extracted from a smoothed MPEG image, and the luminance values of the pixels of the original image, coefficient values that minimize the squared error are determined. This is a solution based on the so-called least square method.

In step S121, the classification coefficient generating section 53 sets a class code that is to be subjected to a determinant computing process, that is, a class code for which coefficients are to be computed from now on. It should be noted that the processing of step S122 to step S124 that will be described later is executed once for each single class code.

In step S122, the classification coefficient generating section 53 computers an inverse matrix. At this time, the inverse matrix of the leftmost matrix in Equation (2) is computed.

In step S123, the classification coefficient generating section 53 computes the product of the rightmost matrix in Equation (2) and the inverse matrix computed in the processing of step S122 to calculate coefficients corresponding to the class code.

For example, if the class code set in step S121 is "x (in actuality, a code indicated by a bit string of 11 bits)", coefficients coef[0][x] to coef[Ld][x] are calculated in step S123.

In step S124, the classification coefficient generating section 53 stores the coefficients calculated in step S123 into the coefficient storing section 54 in association with the class code.

In step S125, the classification coefficient generating section 53 determines whether or not there is a next class code. If it is determined that there is a next class code, the process returns to step S121. Then, a new class code is set, and the processing of step S121 to S125 is repeatedly executed.

If it is determined in step S125 that there is no next class code, that is, if the coefficients coef[0][cls] to coef[Ltd][cls] in Equation (2) have been obtained with respect to all class codes, the determinant computing process ends. This means that the coefficient calculating process in FIG. 7 also ends, so the class-specific coefficient generating process in FIG. 4 ends.

In this way, coefficients are calculated for each class code and stored. Since the coefficients are obtained on the basis of Equation (2), these are the coefficients by which the pixel values of pixels of a prediction tap centered on each target pixel in a smoothed MPEG image are multiplied, and which are the optimum coefficients for obtaining the pixel value of a pixel in the original image which corresponds to the target pixel.

Also, according to an embodiment of the present invention, each of target pixels within a smoothed MPEG image is classified by a class code that is made up of a tap length used in the smoothing process, and a code indicating the characteristic of the waveform of variation in pixel values within a class tap.

As described above with reference to FIG. 6, the tap length (the size of a tap) used in the smoothing process varies in accordance with the target pixel extracted from the MPEG image and the dynamic range of the values of its neighboring pixels. Thus, classification according to the intensity of noise included in the MPEG image can be performed. Further, as described above with reference to FIG. 10, the characteristic of the waveform of variation in pixel values within a class tap is converted into a code. Thus, classification can be performed by finely identifying the target pixel and the characteristic of variation of the values of its neighboring pixels.

That is, according to an embodiment of the present invention, on the precondition that noise included in an image that has been compressed and encoded and then decoded be removed by smoothing, it is possible to perform the optimum classification in establishing the correspondence between the values of the pixels of the smoothed image and the values of the pixels of the original image.

In the foregoing, the processing performed by the coefficient generation processing section 31 in FIG. 1 has been described in detail with reference to FIGS. 4 to 12. For example, a plurality of coefficient-generating images may be inputted to the image processing device 10 in advance, and the optimum coefficients for obtaining the pixel value of a pixel in the original image which corresponds to the target pixel may be stored into the coefficient storing section 54.

After coefficients are calculated by the coefficient generation processing section 31 for each class code and stored, for example, it is possible to input an arbitrary MPEG image as a target processing image, generate the pixel values of an image from which noise such as block noise is removed and which has a high level of perceived resolution by the processing of the pixel value generation processing section 32, and output a processed image formed by the corresponding pixels.

Next, referring to the flowchart in FIG. 13, a description will be given of a pixel value generating process performed by the image processing device 10 according to an embodiment of the present invention. This process is executed by the pixel value generation processing section 32 when the data of a target processing image (MPEG image) is inputted, for example.

In step S141, the smoothing processing section 72 sets the position of a target pixel to an upper left position of the screen of the target processing image.

In step S142, the smoothing processing section 72 sets the code cls_a corresponding to the tap size used in the smoothing process of the target processing image to "0", and sets the threshold DRth of the dynamic range of pixels within a tap, and the maximum value Tmax of the tap size.

In step S143, the smoothing processing section 72 executes a smoothing process. While a detailed description of this process is omitted since the process is the same as that described above with reference to FIG. 5, through this process, the data of a smoothed MPEG image is generated. As described above, while the smoothed MPEG image is removed of noise such as block noise, the smoothing diminishes the perceived detail or resolution of the image, so the entire screen appears blurred and sharpness is lost, resulting in an image with lower perceived resolution. Also, a code indicating the tap length of a tap used in the smoothing process is generated as well.

It should be noted that as in the case described above with reference to FIG. 5, in the smoothing process according to an embodiment of the present invention, smoothing is done by computing the average of pixel values, without assigning weights to pixels within the tap. This is because in the related art schemes using a filter such as a Gaussian filter that assigns a large weight to the target pixel, in a case where, for example, a noise component is superimposed on the target pixel, the noise component often does not disappear even after smoothing.

In step S144, the smoothing processing section 72 outputs the data of the smoothed MPEG image generated in the processing of step S143. The data outputted at this time corresponds to the smoothed MPEG image in FIG. 3.

In step S145, the smoothing processing section 72 outputs the code Cls_a, which is stored in the processing of step S37 in FIG. 5, in association with information indicating the position of the target pixel. Each such code Cls_a outputted at this time corresponds to the code indicative of tap length in FIG. 3.

The processing up to this point is performed by the smoothing processing section 72. Thereafter, processing by the classification luminance value computing section 73 is performed.

In step S146, the classification luminance value computing section 73 sets the position of a target pixel within the smoothed MPEG image outputted in the processing of step S144. For example, as the first target pixel, a pixel at an upper left position of the screen of the smoothed MPEG image is set as the target pixel.

In step S147, the classification luminance value computing section 73 executes a class code identifying process. While a detailed description of this process is omitted since the process is the same as that described above with reference to FIG. 8, through this process, an ADRC process is performed with respect to each individual pixel of the smoothed MPEG image to calculate an ADRC code, and the class code Cls_c corresponding to each individual pixel is identified on the basis of the code Cls_a (code indicative of tap length) outputted in the processing of step S145, and the ADRC code (code Cls_b).

In step S148, the classification luminance value computing section 73 reads coefficients corresponding to the class code identified in the process of step S147, from the coefficient storing section 54.

In step S149, the classification luminance value computing section 73 executes a pixel value computing process that will be described later with reference to FIG. 14.

Now, referring to the flowchart in FIG. 14, a description will be given of the details of the pixel value computing process in step S149 of FIG. 13.

In step S171, the classification luminance value computing section 73 extracts a prediction tap centered on the target pixel set in the processing of step S146. At this time, for example, the same tap as the class tap used in the class code identifying process in step S147 may be used as the prediction tap, or a tap different from the class tap may be used as the prediction tap.

Also, in step S171, the classification luminance value computing section 73 holds the luminance values Ytp[m] of pixels within the prediction tap. If the number of pixels (tap length) within the prediction tap is Ld, then m=(0, 1, . . . Ld), and luminance values Ytd[0], Ytd[2], . . . Ytd[Ld] are held. The numbers "0" to "Ld" indicate the positions of pixels within the prediction tap.

In step S172, the classification luminance value computing section 73 multiples the luminance values Ytp[m] by the coefficients read in step S148 to obtain the luminance value Ym of the target pixel in the processed image.

At this time, a linear primary operation expressed by Equation (3) is executed.

$$Ym = \sum_{i=0}^{Ld} coef[i][Cls\_c]Y_{tp}[i] \quad (3)$$

The variable i corresponds to a number indicating the position of a pixel within a prediction tap.

The luminance value Ym thus computed is set as the value of the target pixel in the processed image.

Returning to FIG. 13, after the processing of step S149, the process proceeds to step S150, where the classification luminance value computing section 73 determines whether or not there is a next pixel. If it is determined that there is a next pixel, the process returns to step S146. Then, in step S146, the next pixel is set as a target pixel. In this way, in the smoothed MPEG image, the position of a target pixel moves in, for example, the raster order.

If it is determined in step S150 that there is no next pixel, that is, after the processing of steps S147 to S149 has been executed with all the pixels forming the smoothed MPEG image set as target pixels, the process proceeds to step S151.

In step S151, the classification luminance value computing section 73 outputs the data of an image formed by the pixels whose luminance values have been computed in the processing of step S172, as the data of a processed image. The data of the processed image outputted at this time corresponds to the processed image in FIG. 3. As described above, in the processed image, the value (luminance value) of each target pixel of the smoothed MPEG image is replaced by the value obtained by Equation (3).

The data of a processed image is outputted in this way. The processed image is an image generated by smoothing a target processing image (MPEG image) by the smoothing processing section 72, and further applying the pixel value generating process to the smoothed MPEG image by the classification luminance value computing section 73. Therefore, it is possible to generate an image from which noise such as block noise produced upon decoding a compressed/encoded image is removed, and which has a high level of perceived resolution.

While the foregoing description is directed to a case where an image that has been compressed and encoded in the MPEG scheme and then decoded is processed, the present invention is also applicable to an image that has been compressed and encoded in a scheme other than the MPEG scheme and then decoded.

For example, since processing based on the H264/AVC deblocking filter is executed in accordance with a decoding process, blocking information at the time of encoding in the H264/AVC scheme can be used. Thus, block boundaries can be easily identified. However, for images encoded in other schemes (for example, MPEG), a noise reduction effect may not be expected even when such processing is executed. Also, for example, when displaying a decoded image having an aspect ratio different from that of an encoded image, even if blocking information used at the time of encoding can be used, it is difficult to identify block boundaries on the basis of that information.

According to an embodiment of the present invention, for example, it is possible to generate a beautiful image, irrespective of the aspect ratio of the image, or irrespective of the compression and encoding scheme.

While it is also possible to reduce perceived noise by smoothing the entire screen without identifying block boundaries, in this case, the smoothing diminishes the perceived detail or resolution of the image, so the entire screen appears blurred, resulting in a loss of sharpness. That is, even the amplitude of pixel luminance due to image detail or the like, which is not actually block noise, is erroneously smoothed, diminishing the perceived resolution of the image.

According to an embodiment of the present invention, the luminance values of the pixels of the processed image are computed by using the coefficients that are obtained by processing the coefficient-generating image (original image) and are stored in the coefficient storing section 54. Thus, it is possible to reproduce the characteristics of the original image with greater accuracy, and prevent loss of perceived detail in the image even after smoothing.

In the filtering process aimed at noise reduction according to the related art, the pixel value of a target pixel is obtained by assigning weighting coefficients to a plurality of pixels centered on the target pixel. However, in a case where the target pixel itself contains noise, there is a possibility that the noise component remains visible even after the filtering process.

According to an embodiment of the present invention, as described above, smoothing is done by computing the average of pixel values, without assigning weights to pixels within a tap. Therefore, even when the target pixel itself contains noise, its influence can be reduced.

Figure 15:
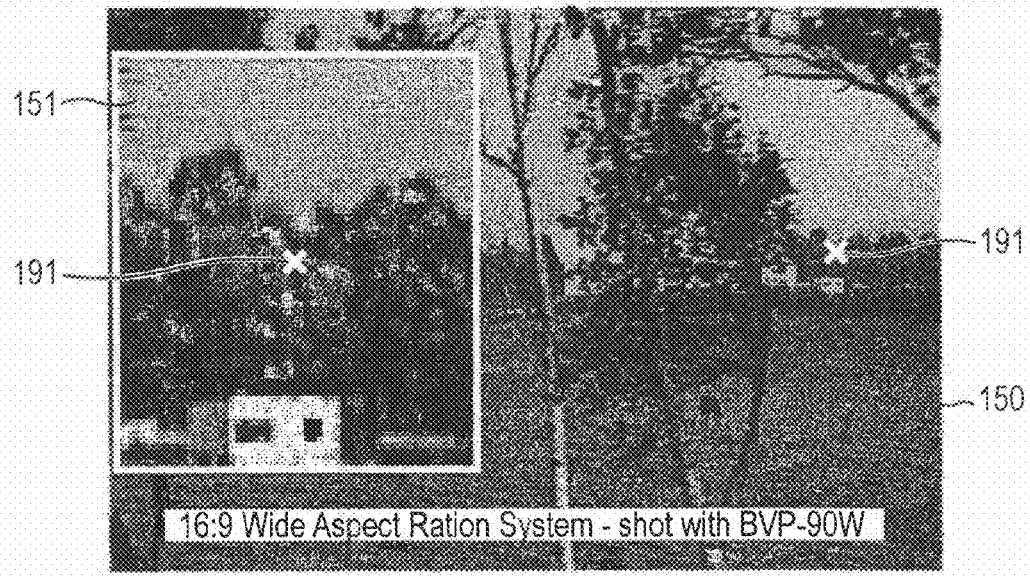
FIG. 15 is an image obtained by compressing and encoding an original image in the MPEG scheme and then decoding the resulting image.
Figure 16:
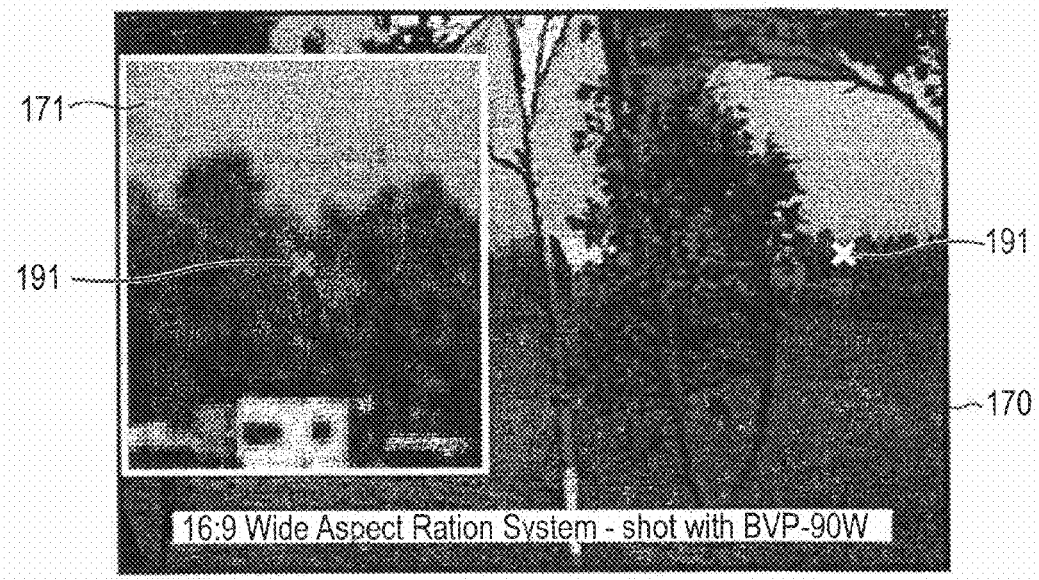
FIG. 16 is a view showing a processed image obtained by inputting the image in FIG. 15 as a target processing image to an image processing device according to an embodiment of the present invention.

FIGS. 15 and 16 are views each showing an example of an image for explaining the effect of an embodiment of the present invention. FIG. 15 is a view showing an image 150 obtained by compressing and encoding an original image in the MPEG scheme and then decoding the resulting image, and FIG. 16 is a view showing an image 170 that is a processed image obtained by inputting the image 150 to the image processing device 10 according to an embodiment of the present invention as a target processing image.

In FIG. 15, an enlarged view of the portion including an X-shaped pattern 191 on the right side of FIG. 15 in the image 150 is shown in an area 151. In the image displayed inside the area 151, block noise is large enough to be visible.

In FIG. 16 as well, an enlarged view of the portion including the X-shaped pattern 191 on the right side of FIG. 16 in the image 170 is shown in an area 171. It should be noted that the object (in this example, a part of a building) displayed in the area 151 in FIG. 15 and the object displayed in the area 171 in FIG. 16 are the same. In the image displayed inside the area 171, block noise is removed to an extent that is almost invisible.

Comparing the image 150 and the image 170 with each other, the image 170 has a sufficient level of perceived detail, and there is no loss of perceived resolution.

Thus, a comparison between the image 150 and the image 170 obtained from the same original image reveals that the image 170 appears to have less noise, and does not give an impression of loss of perceived resolution.

As described above, according to an embodiment of the present invention, an image with high perceived resolution can be generated while reducing perceived noise.

While mainly block noise is removed by smoothing in the foregoing description, the noise to be removed is not limited to block noise. Of course, for example, it is also possible to remove white noise by smoothing.

Figure 17:
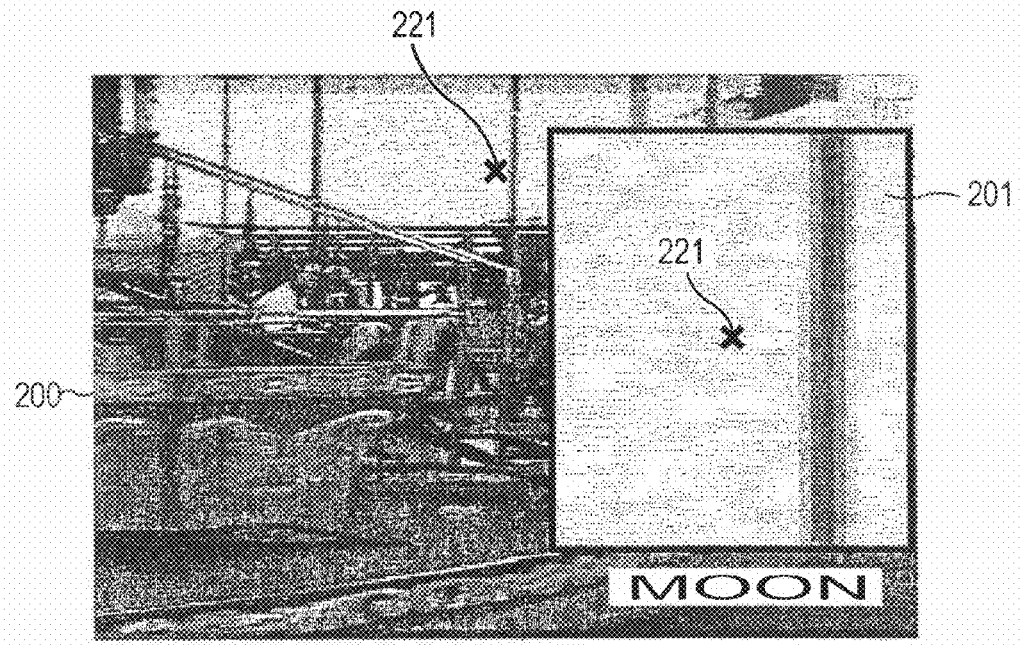
FIG. 17 is a view showing an image that is obtained by processing an original image and contains white noise.
Figure 18:
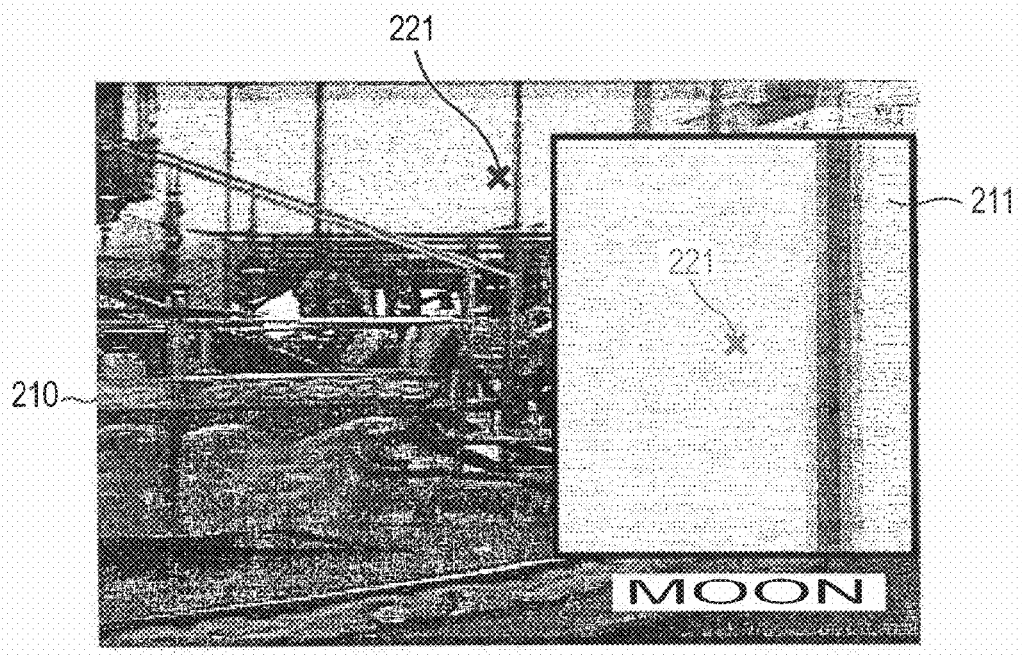
FIG. 18 is a view showing a processed image obtained by inputting the image in FIG. 17 as a target processing image to an image processing device according to an embodiment of the present invention.

FIGS. 17 and 18 are views each showing another example of an image for explaining the effect of an embodiment of the present invention. FIG. 17 is a view showing an image 200 which is an image generated by applying some processing to an original image and in which white noise is contained. FIG. 18 is a view showing an image 210 that is a processed image obtained by inputting the image 200 to the image processing device 10 according to an embodiment of the present invention as a target processing image.

In FIG. 17, an enlarged view of the portion including an X-shaped pattern 221 on the right side of FIG. 17 in the image 200 is shown in an area 201. In the image displayed inside the area 201, white noise is large enough to be visible.

In FIG. 18 as well, an enlarged view of the portion including the X-shaped pattern 221 on the right side of FIG. 18 in the image 210 is shown in an area 211. It should be noted that the object (in this example, a part of a building) displayed in the area 201 in FIG. 17 and the object displayed in the area 211 in FIG. 18 are the same. In the image displayed inside the area 211, white noise is removed to an extent that is almost invisible.

Comparing the image 200 and the image 210 with each other, the image 210 has a sufficient level of perceived detail, and there is no loss of perceived resolution.

Thus, a comparison between the image 200 and the image 210 obtained from the same original image reveals that the image 210 appears to have less noise, and does not give an impression of loss of perceived resolution.

As described above, according to an embodiment of the present invention, an image with high perceived resolution can be generated while reducing perceived noise.

It should be noted, however, that in a case where white noise is to be removed by the image processing device 10 according to an embodiment of the present invention, in the coefficient generation processing section 31, it is necessary to generate an image containing white noise by the decoder/encoder 51 (or a functional block as its alternative), smooth the image containing white noise by the smoothing processing section 52, and execute the processing of the classification coefficient generating section 53. That is, in a case where white noise is to be removed by the image processing device 10 according to an embodiment of the present invention, it is necessary to obtain coefficients different from the coefficients suitable for removing block noise in advance and store the coefficients into the coefficient storing section 54.

The series of processes described above can be executed by hardware, or can be executed by software. If the series of processes is to be executed by software, a program constituting the software is installed from a network or a recording medium into a computer embedded in dedicated hardware, or into, for example, a general purpose personal computer 700 as shown in FIG. 19 which is capable of executing various functions by installing various programs into the general purpose personal computer 700.

In FIG. 19, a CPU (Central Processing Unit) 701 executes various processes in accordance with a program stored in a ROM (Read Only Memory) 702, or a program loaded from a storing section 708 into a RAM (Random Access Memory) 703. The RAM 703 also stores data or the like necessary for the CPU 701 to execute various processes, as appropriate.

The CPU 701, the ROM 702, and the RAM 703 are connected to each other via a bus 704. The bus 704 is also connected with an input/output interface 705.

The input/output interface 705 is connected with an input section 706 configured by a keyboard, a mouse, or the like, a display configured by a CRT (Cathode Ray Tube), an LCD (Liquid Crystal display), or the like, an output section 707 configured by a speaker or the like, the storing section 708 configured by a hard disk or the like, and a communication section 709 configured by a modem, a network interface card such as a LAN card, or the like. The communication section 709 performs a communication process via a network including the Internet.

As necessary, the input/output interface 705 is also connected with a drive 710, in which a removable medium 711 such as a magnetic disk, an optical disk, a magneto-optical disk, or a semiconductor memory is mounted as appropriate. A computer program read from the removable medium 711 is installed into the storing section 708 as necessary.

If the series of processes described above is to be executed by software, a program constituting the software is installed from a network such as the Internet, or a recording medium such as the removable medium 711.

Examples of this recording medium include not only one configured by the removable medium 711 shown in FIG. 19, such as a magnetic disk (including a floppy disk (R)), an optical disk (including a CD-ROM (Compact Disk-Read Only Memory) or a DVD (Digital Versatile Disk)), a magneto-optical disk (including an MD (Mini-Disk)(R)), or a semiconductor memory, which is distributed separately from the device main body to deliver a program to a user and in which the program is recorded, but also one configured by the ROM 702, a hard disk included in the storing section 708, or the like which is delivered to a user in a state embedded in the device main body in advance and in which the program is recorded.

The steps for executing the series of processes described above in this specification include not only processes that are executed time sequentially in the order as they appear in the description, but also processes that are not necessarily executed time sequentially but are executed in parallel or independently.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device which processes an input image to generate a processed image, comprising:

smoothing means for extracting a smoothing tap and smoothing a target processing image that is the input image on the basis of pixel values within the smoothing tap, the smoothing tap being variable in size and formed by a plurality of pixels centered on each target pixel of the target processing image;

class tap extracting means for extracting a class tap formed by a plurality of pixels centered on each target pixel in the smoothed target processing image;

class code determining means for generating a code corresponding to a characteristic of variation of pixel values within the class tap, and determining a class code, which includes a size of the smoothing tap and the code corresponding to a characteristic of variation of pixel values; and pixel value computing means for reading tap coefficients corresponding to the determined class code from a storing section, and multiplying individual pixel values forming a prediction tap extracted from the smoothed target processing image, by the tap coefficients to calculate pixel values of the processed image.

2. The image processing device according to claim 1, wherein:
the smoothing means determines a size of the smoothing tap on the basis of a dynamic range of pixel values forming the smoothing tap.

3. The image processing device according to claim 1, wherein:
the smoothing means smoothes the target processing image by calculating an average of pixel values forming the smoothing tap, and setting the average as a value of the target pixel, without assigning a weight to each of the pixel values forming the smoothing tap.

4. The image processing device according to claim 1, wherein:
the class code determining means generates the code corresponding to a characteristic of variation of pixel values by performing ADRC (Adaptive Dynamic Range Coding) with respect to each of pixels within the prediction tap.

5. The image processing device according to claim 4, wherein:
the class code determining means extracts a class tap formed by a plurality of pixels centered on the target pixel and different from the prediction tap, and performs the ADRC with respect to each of pixels within the class tap.

6. An image processing method for an image processing device that processes an input image to generate a processed image, comprising the steps of:
extracting a smoothing tap and smoothing a target processing image that is the input image on the basis of pixel values within the smoothing tap, the smoothing tap being variable in size and formed by a plurality of pixels centered on each target pixel of the target processing image;
extracting a class tap formed by a plurality of pixels centered on each target pixel in the smoothed target processing image;
generating a code corresponding to a characteristic of variation of pixel values within the class tap, and determining a class code, which includes a size of the smoothing tap and the code corresponding to a characteristic of variation of pixel values; and
reading tap coefficients corresponding to the determined class code from a storing section, and multiplying individual pixel values forming a prediction tap extracted from the smoothed target processing image, by the tap coefficients to calculate pixel values of the processed image.

7. A non-transitory computer-readable medium including a program for causing a computer to function as an image processing device that processes an input image to generate a processed image, the image processing device including:
smoothing means for extracting a smoothing tap and smoothing a target processing image that is the input image on the basis of pixel values within the smoothing tap, the smoothing tap being variable in size and formed by a plurality of pixels centered on each target pixel of the target processing image;
class tap extracting means for extracting a class tap formed by a plurality of pixels centered on each target pixel in the smoothed target processing image;
class code determining means for generating a code corresponding to a characteristic of variation of pixel values within the class tap, and determining a class code, which includes a size of the smoothing tap and the code corresponding to a characteristic of variation of pixel values; and
pixel value computing means for reading tap coefficients corresponding to the determined class code from a storing section, and multiplying individual pixel values forming a prediction tap extracted from the smoothed target processing image, by the tap coefficients to calculate pixel values of the processed image.

8. A learning device which learns tap coefficients for processing an input image to obtain a processed image, comprising:
smoothing means for extracting a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image;
class tap extracting means for extracting a class tap formed by a plurality of pixels centered on each target pixel in the smoothed decoded image;
class code determining means for generating a code corresponding to a characteristic of variation of pixel values within the class tap, and determining a class code, which includes a size of the smoothing tap and the code corresponding to a characteristic of variation of pixel values;
prediction tap extracting means for extracting a prediction tap formed by a plurality of pixels centered on each target pixel in the smoothed decoded image;
tap coefficient calculating means for obtaining tap coefficients that minimize an error between a result of prediction computation using the prediction tap, and a pixel value in the original image which corresponds to the target pixel, for each the class code; and
tap coefficient storing means for storing the obtained tap coefficients into a storing section for each the class code.

9. The learning device according to claim 8, wherein:
the smoothing means determines a size of the smoothing tap on the basis of a dynamic range of pixel values forming the smoothing tap.

10. The learning device according to claim 8, wherein:
the smoothing means smoothes the decoded image by calculating an average of pixel values forming the smoothing tap, and setting the average as a value of the target pixel, without assigning a weight to each of the pixel values forming the smoothing tap.

11. The learning device according to claim 8, wherein:
the class code determining means generates the code corresponding to a characteristic of variation of pixel values by performing ADRC (Adaptive Dynamic Range Coding) with respect to each of pixels within the prediction tap.

12. The learning device according to claim 11, wherein:
the class code determining means extracts a class tap formed by a plurality of pixels centered on the target pixel and different from the prediction tap, and performs the ADRC with respect to each of pixels within the class tap.

13. A learning method for a learning device that learns tap coefficients for processing an input image to obtain a processed image, comprising the steps of:
extracting a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image;

extracting a class tap formed by a plurality of pixels centered on each target pixel in the smoothed decoded image;

generating a code corresponding to a characteristic of variation of pixel values within the class tap, and determining a class code, which includes a size of the smoothing tap and the code corresponding to a characteristic of variation of pixel values;

extracting a prediction tap formed by a plurality of pixels centered on each target pixel in the smoothed decoded image;

obtaining tap coefficients that minimize an error between a result of prediction computation using the prediction tap, and a pixel value in the original image which corresponds to the target pixel, for each the class code; and storing the obtained tap coefficients into a storing section for each the class code.

14. A non-transitory computer-readable medium including a program for causing a computer to function as a learning device that learns tap coefficients for obtaining a processed image by processing an input image, the learning device including:

smoothing means for extracting a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image;

class tap extracting means for extracting a class tap formed by a plurality of pixels centered on each target pixel in the smoothed decoded image;

class code determining means for generating a code corresponding to a characteristic of variation of pixel values within the class tap, and determining a class code, which includes a size of the smoothing tap and the code corresponding to a characteristic of variation of pixel values;

prediction tap extracting means for extracting a prediction tap formed by a plurality of pixels centered on each target pixel in the smoothed decoded image;

tap coefficient calculating means for obtaining tap coefficients that minimize an error between a result of prediction computation using the prediction tap, and a pixel value in the original image which corresponds to the target pixel, for each the class code; and tap coefficient storing means for storing the obtained tap coefficients into a storing section for each the class code.

15. An image processing device which processes an input image to generate a processed image, comprising:

a smoothing section configured to extract a smoothing tap and smooth a target processing image that is the input image on the basis of pixel values within the smoothing tap, the smoothing tap being variable in size and formed by a plurality of pixels centered on each target pixel of the target processing image;

a class tap extracting section configured to extract a class tap formed by a plurality of pixels centered on each target pixel in the smoothed target processing image;

a class code determining section configured to generate a code corresponding to a characteristic of variation of pixel values within the class tap, and determine a class code, which includes a size of the smoothing tap and the code corresponding to a characteristic of variation of pixel values; and a pixel value computing section configured to read tap coefficients corresponding to the determined class code from a storing section, and multiply individual pixel values forming a prediction tap extracted from the smoothed target processing image, by the tap coefficients to calculate pixel values of the processed image.

16. A learning device which learns tap coefficients for processing an input image to obtain a processed image:

a smoothing section configured to extract a smoothing tap and smoothing a decoded image, which is obtained by compressing/encoding and decoding an original image, on the basis of pixel values within the smoothing tap, the smoothing tap being variable in size and formed by a plurality of pixels centered on each target pixel of the decoded image;

a class tap extracting section configured to extract a class tap formed by a plurality of pixels centered on each target pixel in the smoothed decoded image;

a class code determining section configured to generate a code corresponding to a characteristic of variation of pixel values within the class tap, and determine a class code, which includes a size of the smoothing tap and the code corresponding to a characteristic of variation of pixel values;

a prediction tap extracting section configured to extract a prediction tap formed by a plurality of pixels centered on each target pixel in the smoothed decoded image;

a tap coefficient calculating section configured to obtain tap coefficients that minimize an error between a result of prediction computation using the prediction tap, and a pixel value in the original image which corresponds to the target pixel, for each the class code; and a tap coefficient storing section configured to store the obtained tap coefficients into a storing section for each the class code.

\* \* \* \* \*